United States Patent [19]

Ohouchi et al.

[11] Patent Number: 4,959,805
[45] Date of Patent: Sep. 25, 1990

[54] COORDINATE DETECTING DEVICE

[75] Inventors: Junichi Ohouchi; Hiroaki Sasaki; Kazuo Hasegawa, all of Furukawa, Japan

[73] Assignee: Alps Electric Co., Ltd., Tokyo, Japan

[21] Appl. No.: 141,118

[22] Filed: Jan. 5, 1988

[30] Foreign Application Priority Data

| Mar. 17, 1987 | [JP] | Japan | 62-62157 |
| Mar. 17, 1987 | [JP] | Japan | 62-62158 |
| Mar. 17, 1987 | [JP] | Japan | 62-62159 |
| Mar. 17, 1987 | [JP] | Japan | 62-62160 |
| Mar. 17, 1987 | [JP] | Japan | 62-62161 |

[51] Int. Cl.$^5$ .......................... G09G 1/28; G08C 21/00
[52] U.S. Cl. ........................................ 364/562; 178/18; 340/706; 341/5
[58] Field of Search ................... 364/562; 178/18–20; 340/706, 709, 710; 341/1, 5, 6, 12, 13; 250/205, 221

[56] References Cited

U.S. PATENT DOCUMENTS

| 3,875,403 | 4/1975 | Svensson . | |
| 3,916,099 | 10/1975 | Hlady . | |
| 4,054,746 | 10/1977 | Kamm | 178/19 |
| 4,238,792 | 12/1980 | Cohen et al. . | |
| 4,334,124 | 6/1982 | Imsand et al. | 178/18 X |
| 4,368,352 | 1/1983 | Davis | 178/18 |
| 4,423,299 | 12/1983 | Gurol et al. . | |
| 4,442,317 | 4/1984 | Jandrell | 178/18 |
| 4,504,700 | 3/1985 | Kubo et al. . | |
| 4,566,001 | 1/1986 | Moore et al. . | |
| 4,710,595 | 12/1987 | Kimura | 178/18 |
| 4,739,303 | 4/1988 | Kobayashi | 341/5 |
| 4,754,268 | 6/1988 | Mori | 178/18 X |
| 4,777,329 | 10/1988 | Mallicoat | 178/18 |
| 4,801,797 | 1/1989 | Ohouchi et al. | 341/5 X |
| 4,806,749 | 2/1989 | Ohuchi et al. | 341/5 X |
| 4,812,642 | 3/1989 | Hasegawa et al. | 250/221 |

FOREIGN PATENT DOCUMENTS 60-86417  5/1985  Japan .

Primary Examiner—Parshotam S. Lall
Assistant Examiner—Joseph L. Dixon
Attorney, Agent, or Firm—Guy W. Shoup; David W. Heid

[57] ABSTRACT

The coordinate detecting device according to this invention processes a plurality of detected adjoining input values scanned from an optical inputting grid and creates a single average value from the plurality which single value it provides to a host computer. It also evaluates data received from said optical inputting grid and restarts the scanning of the optical inputting grid independent of processing through a host computer when no input value is detected. It also receives and stores each input value received from said optical inputting grid, but does not provide an output to a host computer as long as an input value is detected, when an input value is no longer detected the last input value stored is outputted to a host computer. It also receives and stores each input values received from said optical inputting grid and compares each new value with the previous value which has been stored and when a difference between the new and the previous signals is detected the previous value stored is outputted to a host computer. It also receives and evaluates each input value received from said optical inputting grid and compares each new value with one or more valid value ranges previously stored and when an input value is in the valid range a range identifying signal corresponding to the range in which the valid signal is detected is outputted to a host computer, but when the evaluation shows that the value is not in a valid value range scanning is restarted and no signal is output to the host computer. Each of these functions relieves the amount of processing that the host computer is required to perform and thereby frees it for other tasks.

15 Claims, 11 Drawing Sheets

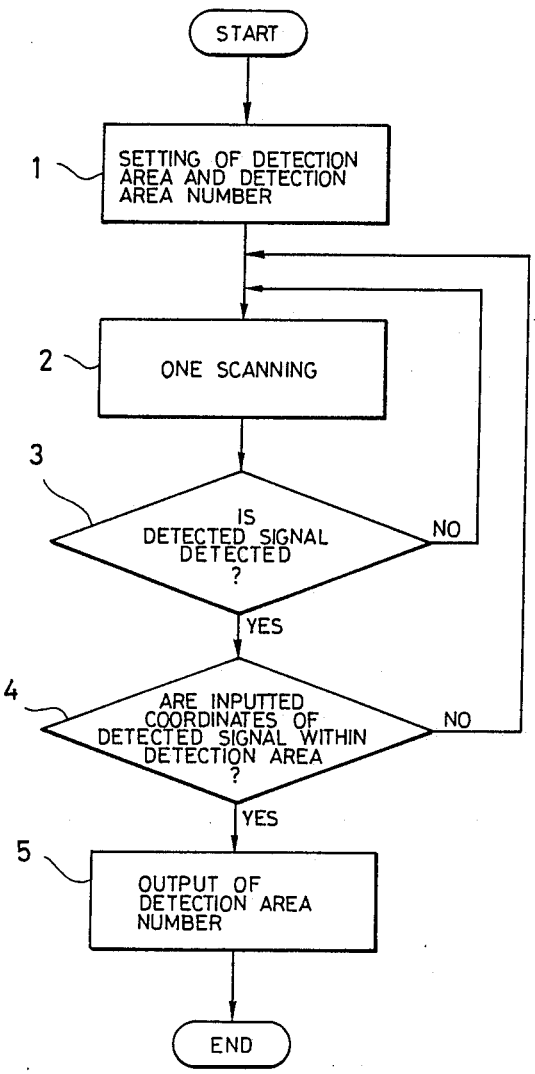

COORDINATE DETECTING DEVICE

FIELD OF INVENTION

This invention relates to a coordinate detecting device transforming data detected by a coordinate detecting section into a desired output form and in particular to a coordinate detecting device having means for recognizing the beginning or the termination of a scan by means of the coordinate detecting section and means for recognizing the detection state of the coordinate detecting section to output coordinate data in a desired output form.

BACKGROUND OF THE INVENTION

A coordinate input device is an efficient means in the field of digital techniques and particularly as a means to input information into a computer. Various types of coordinate inputting devices are known. For example, those disclosed in U.S. Pat. No. 4,566,001, which are located in front of a display device, permitting an input operation according to the content of the display, or those disclosed in U.S. Pat. No. 4,504,700, for which an input operation can be effected by the coordinating input device alone. Due to the ease of learning the input operation, there is a growing trend toward the use of input devices which provide an input according to the content of a display. These devices include various sorts of detecting means such as a coordinate input device as disclosed e.g. in U.S. Pat. No. 4,423,299, having electrical contacts, a coordinate input device as disclosed e.g. in U.S. Pat. No. 4,238,792, having a light pen, a coordinate input device as disclosed e.g. in U.S. Pat. No. 3,916,099, having detecting means for detecting mechanical vibration, etc. No matter what detecting means are used, where they are used for a digital computer, the values of the coordinate data for the ordinate and the abscissa are outputted time sequentially. When the relation between the coordinate input device and the computer is considered, it is usual that the computer's processing capabilities are required for almost all processings. An example which tries to deal with this problem is disclosed in well known U.S. Pat. No. 3,875,403. The detecting means for this coordinate input device is constructed of photoelectric switches which recognize the interruption of a plurality of beams between light emitting and receiving devices. Recently the properties of these types of coordinate input devices have been evaluated to be excellent. In addition, the industrial infrastructure for supplying semiconductor light emitting and receiving devices is well organized. The demands for and on such devices have increased greatly both from the point of view of their supply and from the point of view of their characteristics.

The prior art techniques will be explained below, taking such a coordinate input device as an example.

These types of optical coordinate detecting devices contain a plurality of pairs of light sources and corresponding light sensitive elements with a predetermined frequency (spacing). Light sources are driven one after another, depending on the counter value outputted by a counting circuit; when the light path is interrupted due to a coordinate input operation and the corresponding light sensitive element does not receive any light, a detection signal is outputted. The counter value corresponding to this detection signal is outputted as an input coordinate. Further, devices effecting the coordinate detection in X - Y coordinates contain a plurality of pairs of light sources and corresponding light sensitive elements in the directions of the X and the Y axes.

In these devices, where a plurality of light paths emitted by these light sources are interrupted at the same time and a plurality of light sensitive elements do not receive any light so that detection signals are outputted successively in the order of their drive, it is desirable that the average value of the inputted coordinates is calculated as their central position.

Techniques for calculating the average value of inputted coordinates are disclosed in JP-A-60-86417. According to these techniques all the inputted coordinates detected successively are added by means of an adder and the average value is calculated by dividing the sum thus obtained by the number of the successively inputted coordinates.

Further, among this kind of device, in an optical coordinate detecting device, every time one scan is terminated, an undetection code, which indicates that there is no inputted coordinate (or no coordinate is inputted), is outputted to a host computer. Then scanning is again started by a signal coming from the host computer.

Furthermore, among this kind of device, the host computer judges in which detection area the inputted coordinate is and a menu operation corresponding to that detection area is carried out.

OBJECT OF THE INVENTION

The techniques described above for calculating the average value of the inputted coordinates provide a means to improve the detection precision, as if another light source and another light sensitive element were located at an intermediate position between 2 adjacent pairs of light sources and light sensitive elements, and the inputted coordinate was detected by it.

Here, the utilization field of the optical coordinate detecting device, an input device for a system, for which the positional precision is considered to be important, such as: an input device, by which a movement is done, judging an inputted coordinate in a predetermined area to be a certain signal; a CAD system, etc. can be cited. In this case, the higher the precision of the inputted coordinate, the larger the load of the host computer which judges and treats the position of the inputted coordinate. A device judging an inputted coordinate in a predetermined area imposes an unnecessary load on the host computer to obtain a high precision for detecting the inputted coordinate. Therefore it is desirable to control the precision for detecting the inputted coordinate by being switched over, depending on how the data will be utilized.

A first object of this invention is, therefore, to provide a coordinate detecting device that permits the detection precision of the inputted coordinate to be switched over so that it matches well with its objective.

In the prior art optical coordinate detecting devices described above, every time one scan is terminated, some signal is outputted and scanning is repeated within a short time, the time which the host computer is occupied by receiving signals and outputting signals to restart the scanning is long. This gives rise to a problem, i.e. that the utilization efficiency of the host computer, etc., which is being used for coordinate input as well as being utilized for other purposes, is low.

Consequently a second object of this invention is to provide a coordinate detecting device that outputs the inputted coordinate when a coordinate input operation is effected and automatically repeats scanning when no coordinate inputting operation is effected so that the device on the output side such as the host computer, etc. is operated with a high efficiency.

Further there is another problem, even if an erroneous coordinate input operation is effected, the inputted coordinate is outputted, because a signal is outputted every time an inputted coordinate is detected, the load of the host computer, etc., which treats this output, is large.

Therefore a third object of this invention is to provide a coordinate detecting device, in which only the last inputted coordinate detected by a coordinate input operation is outputted so that the device on the output side such as the host computer, etc. can be operated with a high efficiency.

In the prior art optical coordinate detecting devices described above, an inputted coordinate, etc. is outputted, every time one scan is terminated. When the inputted coordinate remains at a same position, a duplicated inputted coordinate is outputted to the host computer, etc. for every scan. Where a device described according to this invention is used to detect a trajectory of inputted coordinates, the duplicated inputted coordinates, (during a period of time where the inputted coordinate rests and remains at the same position), are unnecessary as data and only the inputted coordinates, whose positions are different one from another, are necessary. When the same inputted coordinates are outputted in duplicate after each scan the load of the host computer, etc., to which they are given, would be unnecessarily large. Therefore, it is desired that only the inputted coordinates, which are necessary to trace a trajectory of the coordinate input operation and are different from each other, be outputted.

Consequently a fourth object of this invention is to provide a coordinate detecting device, which is constructed so that no duplicated inputted coordinates are outputted so that devices on the output side such as a host computer, etc. can be operated with a high efficiency.

In general, the detection areas, in which menu operations should be carried out, are not set for all the possible inputted coordinates of the detecting device, but they are set only to partly cover the total area.

Therefore, if the inputted coordinate detected for one scan were outputted to the host computer and it were judged that this inputted coordinate is in none of the identified detection areas then the host computer would be used unnecessarily for judging and treating it. Much judgment and treatment time of the host computer is necessary to enable the host computer to judge in which detection area the inputted coordinate is. In addition, since it is the host computer that judges in which detection area the inputted coordinate is, much time is required for the judgment and the treatment by the host computer. In this way, in a prior art optical coordinate detecting device, the load borne by the host computer is large, and the time during which the host computer is occupied, is long. For this reason there is a problem that the time available to utilize the host computer for other purposes is reduced and that the utilization efficiency of the host computer is bad.

Consequently a fifth object of this invention is to provide a coordinate detecting device, in which, only when the inputted coordinate obtained by a coordinate inputting operation is in one of the identified detection areas, a detection are number corresponding thereto is outputted so that the device on the output side such as a host computer, etc. can be operated with a high efficiency.

SUMMARY OF THE INVENTION

In order to achieve an object which is common to the first object to the fifth, a coordinate detecting device according to this invention is characterized in that it comprises means for recognizing the beginning or the termination of a scan in a coordinate detecting section, which is a structure common to all the technical means for achieving the first object to the fifth, and means for grasping the detection state of the coordinate detecting section.

In order to achieve the the first object described above, a first coordinate detecting device according to this invention is characterized in that upon the output of a first detection signal, a counter value corresponding to this detection signal is stored in a detection beginning coordinate memory; the number of detection signals outputted subsequently to the first detection signal is counted by a continuous counting circuit; the counter value stored in the detection beginning coordinate memory is inputted to an adder directly, or after having been doubled by means of a multiplier and at the same time the counter value of the continuous counting circuit is inputted to the adder after having been divided by 2, by means of a divider or directly; and an average value of inputted coordinates continuously outputted is calculated with a precision of the sampling frequency (spacing), or a precision of a half of the sampling frequency (spacing) and outputted.

In order to achieve the second object described above, a second coordinate detecting device according to this invention is characterized in that it comprises detection presence/absence judging means for judging whether the detection signal is present or absent, scan termination judging means for detecting the termination of a scan, and operation controlling means for switching over the operation, depending on the presence or absence of the detection signal, and it is so constructed that when no detection signal is detected and the termination of a scan is detected by the operation controlling means, the counting circuit is reset and the counting is again started so that scanning is repeated; and when the detection signal is detected, the inputted coordinate corresponding to the detection signal is outputted.

In order to achieve the third object described above, a third coordinate detecting device according to this invention is characterized in that it comprises detection presence/absence judging means for judging whether the detection signal is present or absent, coordinate memory means, in which the detection signal is rewritten in the form of a corresponding inputted coordinate and stored; scan termination judging means for detecting the termination of a scan; detection signal memory means for storing the detection of the detection signal from the scan described above; and operation controlling means, in which when the termination of a scan is detected by the scan termination judging means, in the state where no detection signal is stored in the detection signal memory means, the counting circuit is reset and at the same time the counting is again started so that scanning is repeated and in the state where a detection of the detection signal is stored in the detection signal memory means, when the detection signal is detected by the detection presence/absence judging means, the inputted coordinate stored in the coordinate memory means is rewritten and when no detection signal is detected, the inputted coordinate stored in the coordinate memory means is outputted.

In order to achieve the fourth object described above, a fourth coordinate detecting device according to this invention is characterized in that it comprises coordinate memory means for storing the inputted coordinate depending on the detection signal, and means for comparing a newly inputted coordinate obtained by a scan at that time with the inputted coordinate obtained by the preceding scan; when the two inputted coordinates are in accordance with each other, the succeeding scan is started and when they are different, the newly inputted coordinate is outputted and stored in the coordinate memory means and the succeeding scan is started.

In order to achieve the fifth object described above, a fifth coordinate detecting device according to this invention is characterized in that it comprises detection area setting means for setting a plurality of detection areas, detection area number setting means for setting detection area numbers corresponding to the detection areas, and detection position judging means for judging in which detection area the inputted coordinate corresponding to the detection signal is, wherein a corresponding detection area number is outputted by the detection area number setting means, when the inputted coordinate is detected in the identified detection area.

The common technical means described above act in common as follows.

Since only data having a predetermined content is exchanged between the coordinate detecting device and the device on the output side independently of the precision of the inputting operation, the device on the output side can be operated with a high efficiency.

The first coordinate detecting device described above acts as follows.

When by using switching means the counter value stored in the detection beginning coordinate is inputted directly to the adder, and at the same time the counter value stored in the continuous counting circuit is inputted to the adder after having been divided by 2 by means of the divider, the average value of inputted coordinates is calculated with a precision of the frequency (spacing), with which the light sources and the light sensitive elements are arranged. In another scenario, when by using the switching means the counter value stored in the detection beginning coordinate is inputted to the adder after having been doubled by means of the multiplier and at the same time the counter value stored in the continuous counting circuit is inputted directly to the adder, the average value of inputted coordinates is calculated with a high precision corresponding to a half of the frequency (spacing).

The second coordinate detecting device described above acts as follows.

The detection presence/absence judging means for judging whether the detection signal outputted by the coordinate inputting operation is present or absent, and the operation controlling means, whose operation is switched over depending on the presence/absence of the detection of the detection signal by this detection presence/absence judging means, are processed and when no detection signal is detected, it is judged that no coordinate inputting operation is effected and the counting circuit driving the light sources one after another every time one scan is terminated is reset by the operation controlling means. At the same time the counting is again started and scanning is automatically repeated. Consequently no signal is outputted, until a new inputting operation is effected. In addition, since scanning is effected repeatedly, no external signal is needed. In this way, when a detection signal is detected, the inputted coordinate corresponding to this detection signal is outputted.

The third coordinate detecting device described above acts as follows.

Scanning is repeated, until a coordinate inputting operation is effected and an inputted coordinate is detected. When the inputted coordinate is detected, the memory stored in the coordinate memory means is rewritten and scanning is repeated, until the inputted coordinate is detected no more. When the inputted coordinate is no longer detected, the inputted coordinate, which is detected last and stored in the coordinate memory is outputted to the host computer, etc.

The fourth coordinate detecting device described above acts as follows.

The inputted coordinate corresponding to the detection signal detected by the scan at that time is compared with the inputted coordinate corresponding to the detection signal detected by the preceding scan. When they are in accordance with each other, the inputted coordinate is not outputted and the succeeding scan is started. The duplicated inputted coordinate is not outputted. When they are not in accordance with each other, a new inputted coordinate is outputted and the memory is rewritten. At the same time the succeeding scan is started and only the inputted coordinate necessary for tracing a trajectory of the coordinate inputting operation is outputted.

The fifth coordinate detecting device described above acts as follows.

When the detection signal is detected, it is judged in which detection area the inputted coordinate is and the relevant detection area number is outputted. When the detected inputted coordinate is not in any detection area, no signal is outputted.

BRIEF DESCRIPTION OF THE DRAWINGS

FIG. 11 is a flow chart for explaining the operation of the circuit indicated in FIG. 9.

DETAILED DESCRIPTION

Figure 1:
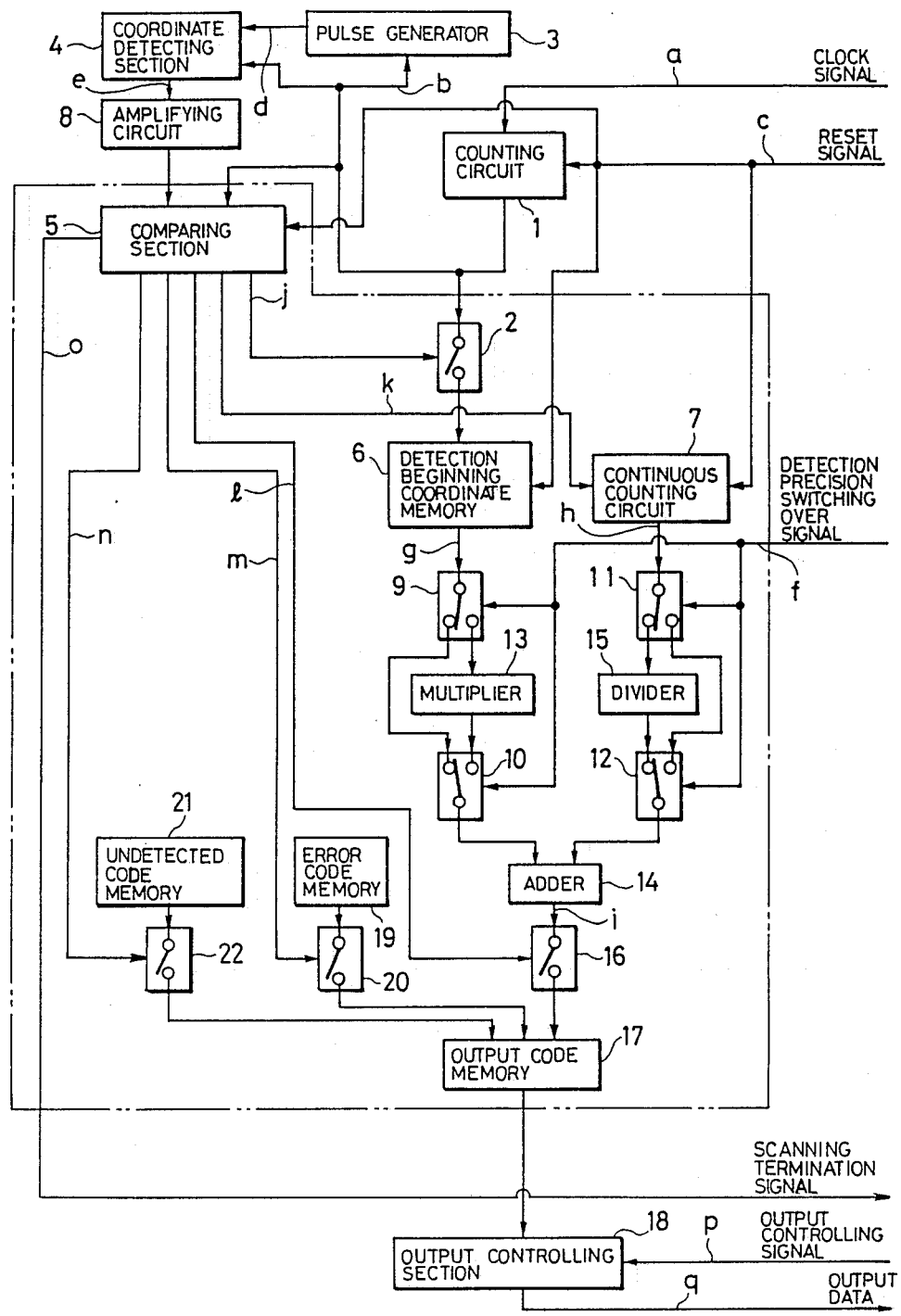
FIG. 1 is a block diagram illustrating the construction of the coordinate detecting device, which is a first embodiment of this invention.

Hereinbelow a first embodiment of this invention will be explained, referring to FIGS. 1 and 2. FIG. 1 is a block diagram illustrating the construction of the coordinate detecting device, which is a first embodiment of this invention, and FIG. 2 is a block diagram illustrating the construction of the comparing section in FIG. 1.

At first, the whole construction will be explained, referring to FIG. 1. In FIG. 1, a clock signal a is given by a host computer to a counting circuit 1. The counter value b of this counting circuit 1 is given to a switch 2, a pulse generator 3, a coordinate detecting section 4 and a comparing section 5. Further a reset signal c is given by the host computer to the counting circuit 1, the comparing section 5, a detection beginning coordinate memory 6 and a continuous counting circuit 7. A driving signal d is given by the pulse generator 3 to the coordinate detecting section 4 and a detection signal e is given through an amplifying circuit 8 to the comparing section 5. In addition, a detection precision switching over signal f is given to 4 switches 9, 10, 11, and 12 linked with each other, which are switching means. The counter value of the counting circuit 1 is given through the switch 2 to the detection beginning coordinate memory 6 and the counter value g stored in the detection beginning coordinate memory 6 is given through the switch 9 to the switch 10 directly or through a multiplier 13 multiplying a factor 2 and inputted through the switch 10 to an adder 14. The counter value h of the continuous counting circuit 7 is given through the switch 11 to the switch 12 through a divider 15 dividing by a factor 2 or directly and further through this switch 12 to an adder 14. An operation value i of this adder 14 is given through a switch 16 to an output code memory 17; stored after having been transformed into a code; and further given to an output controlling section 18. Furthermore an error code is given by an error code memory 19 through a switch 20 to an output code memory 17 and an undetection code is given by an undetected code memory 21 through a switch 22 to an output code memory 17. A signal j is given by the comparing section 5 to the switch 2; a signal k to the continuous counting circuit 7; signal l, m and n to the switches 16, 20 and 22, respectively; and a signal o to the host computer as the scan termination signal. In addition, an output controlling signal p is given by the host computer to an output controlling section 18 and output data q are given to the host computer.

Figure 2:
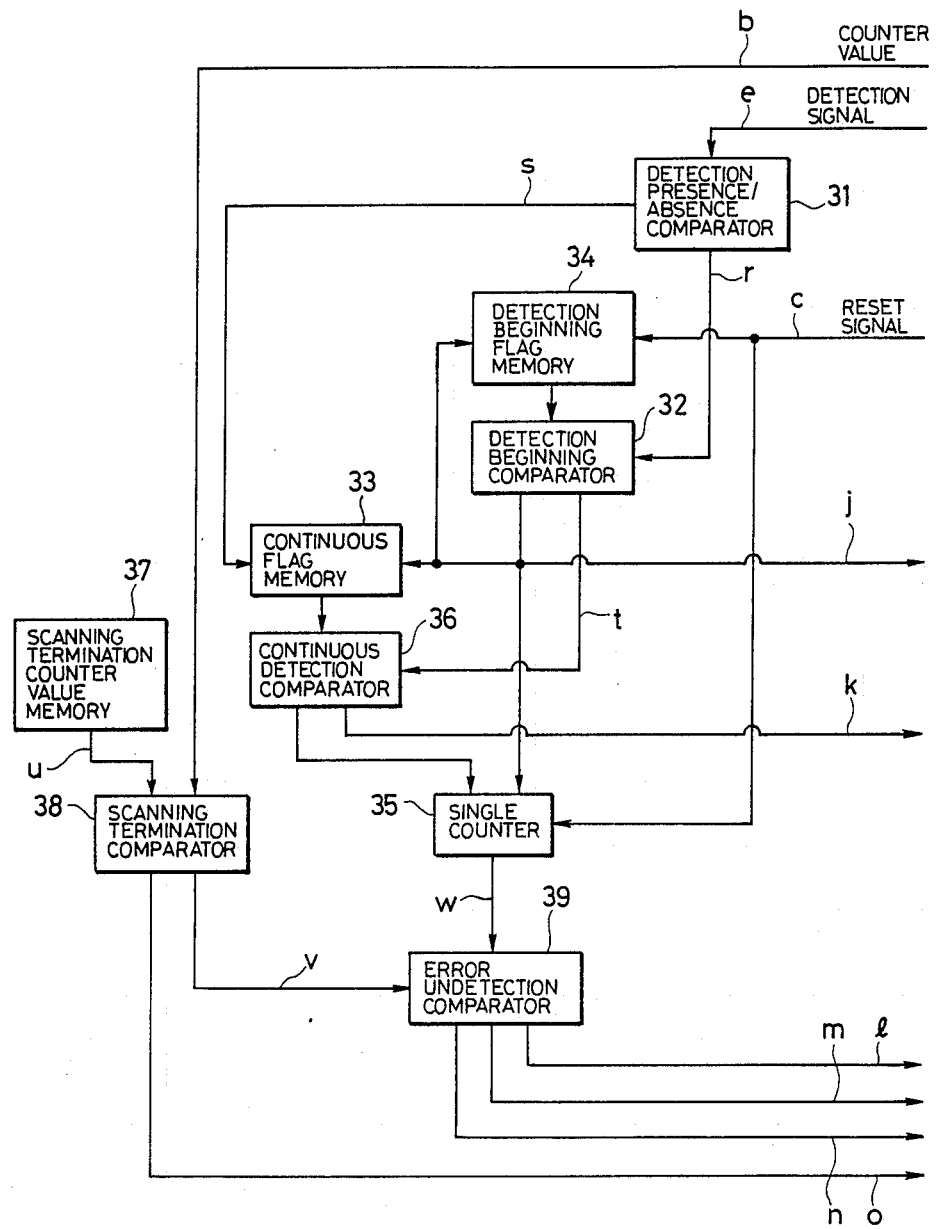
FIG. 2 is a block diagram illustrating the construction of the comparing section in FIG. 1.

Now the comparing section 5 is explained, referring to FIG. 2. In FIG. 2, the detection signal e is given to a detection presence/absence comparator 31. If the detection signal exists, a signal r is given to a detection beginning comparator 32 and if not, a signal s is given to a continuous flag memory 33. The detection beginning comparator 32 judges whether a detection beginning flag memory 34 is in the set state or the reset state. If it is in the reset state, the detection beginning flag memory 34 and the continuous flag memory 33 are put in the set state; the content of a single counter 35 is increased by 1; and at the same time a signal j closing temporarily the switch 2 is outputted and if it is in the set state, a signal t is given to a continuous detection comparator 36. The continuous detection comparator 36, to which this signal t has been given, judges whether the continuous flag memory 33 is in the reset state or in the set state. If it is in the reset state, the content of the single counter 35 is increased by and if it is in the set state, the signal k is given to the continuous counting circuit 7.

Furthermore a counter value, with which one scan is terminated, is previously stored in a scan termination counter value memory 37 and the scan termination counter value u is given to a scan termination comparator 38. The counter value b is given to this scan termination comparator 38. If the scan termination counter value u and the counter value b are in accordance with each other, a signal v is given to an error undetection comparator 39 and at the same time the scan termination signal o is given to the host computer. The error undetection comparator 39, to which the signal v is given, gives the signal n to the switch 22 connected with the undetected code memory 21 when a counter value w of the single counter 35 is "0", the signal l to the switch 16 connected with the adder 14 when it is "1", and the signal m to the switch 20 connected with the error code memory 19 when it is "not smaller than 2", and thus closes temporarily either one of the switches 16, 20 and 22. In addition the reset signal c is given to the detection beginning flag memory 34 and the single counter 35.

The operation of the circuit having such a construction is as follows. When the reset signal c is released, the counting circuit 1 begins to count and at the same time the light sources are driven one after another in the coordinate detecting section 4 so that scanning is started. Then, when a coordinate inputting operation is effected and the first detection signal e is given by the coordinate detecting section 4 to the comparing section 5, the detection presence/absence comparator 31 drives the detection beginning comparator 32. Here the detection beginning flag memory 34 is in the reset state; the signal j is outputted so that the detection beginning flag memory 34 and the continuous flag memory 33 are put in the set state; the content of the single counter 35 is increased by 1; the switch 2 is closed temporarily; and the counter value of the counting circuit 1 is stored in the detection beginning coordinate memory 6. Subsequently, when the detection signal e is given to the comparing section 5, since the detection beginning flag memory 34 is in the set state, the detection beginning comparator 32 gives the continuous detection comparator 36 the signal t so as to drive it. Since the continuous flag memory 33 is in the set state, this continuous detection comparator 36 gives the continuous counting circuit 7 the signal k. When detection signals e are continuously given to the comparing section 5, this signal k is given (the number of successive detection signals−1) times to the continuous counting circuit 7 and counted.

At this time, if for a certain scan no detection signal e is given to the comparing section 5, the content of the single counter 35 remains "0". Further, when only one detection signal e is given thereto, no signal k is outputted by the continuous detection comparator 36. Furthermore, in the case where in one scan the detection signal e is once interrupted and given two or more times to the comparator 5, since the signal s is given by the detection presence/absence comparator 31 to the continuous flag memory 33 and puts it in the reset state when the first detection signal e is interrupted, a signal to increase the content of the single counter 35 by 1 is given by the continuous detection comparator 36 on the basis of the succeeding detection signal e and thus the content of the single counter 35 becomes "not smaller than 2".

When one scan is terminated and the signal v is given to the error undetection comparator 39, one of the signals l, m and n corresponding to the counter value of the single counter 35 is outputted.

Now, when the counter value g is given through the switches 9 and 10 directly to the adder 14 on the basis of the detection precision switching over signal f and at the same time the counter value h is given through the switches 11 and 12 to the adder 14 after having been divided by a factor 2 by means of the divider 15, the counter value g stored in the detection beginning coordinate memory 6 being A, the number of successive detection signals e being N, the operation value of the adder 14 being B, the counter value h of the continuous counting circuit 7 being (N−1), the following relationship is obtained:

$$B = A + \frac{(N-1)}{2}$$

By using this formula while counting fractions of 0.5 and over as a unit and cutting away the rest, the average value of the inputted coordinates, for which the detection signals e are successively obtained, can be calculated with a precision of the frequency (spacing), with which the light sources and the light sensitive elements are arranged.

In another scenario, when the counter value g is given through the switches 9 and 10 to the adder 14 after having been multiplied by a factor 2 by means of the multiplier 13 on the basis of the detection precision switching over signal f and at the same time the counter value h is given through the switches 11 and 12 directly to the adder 14 being B', the following relationship is obtained:

$$B' = 2A + (N-1)$$

Here the operation value B represents coordinates set with a frequency (spacing) of the arrangement of the light sources, etc., corresponding to the light sources and the light sensitive elements and the operation value B' represents coordinates set with a frequency (spacing) of a half of that of the arrangement of the light sources, etc.

Furthermore, when the counter value of the single counter 35 is "1" and the signal l is outputted by the error undetection comparator 39, by closing the switch 16 the operation value i is given to the output code memory 17, stored and further given to the output controlling section 18. When the counter value of the single counter 35 is "2" and the signal m is outputted by the error undetection comparator 39, by closing the switch 20 the error code is given by the error code memory 19 to the output code memory 17 and further to the output controlling section 18. Further, when the counter value of the single counter 35 is "0" and the signal n is outputted by the error undetection comparator 39, by closing the switch 22 the undetection code is given by the undetection code memory 21 to the output code memory 17 and further to the output controlling section 18. In this way, either the average value of the inputted coordinate thus operated or the undetection code or the error code is stored in the output code memory 17, every time one scan is terminated, and given by the output controlling section 18 as output data q, depending on the output controlling signal p coming from the host computer.

The embodiment described above indicates a device, in which scanning is effected in the direction of one axis in order to detect a coordinate. In order to effect coordinate detection in X - Y coordinates, 2 of the block circuit enclosed by the dot-dashed line in FIG. 1 are required. In this case scanning is effected by using one of the block circuits as the X-axis coordinate detecting device and when scanning by this block circuit is terminated, it is disabled. Then scanning is effected by using the other block circuit as the Y-axis coordinate detecting device.

As explained above, according to the coordinate detecting device, which is the first embodiment of this invention, it is possible to calculate the average value of the inputted coordinates with a high precision of a frequency (spacing) or a half of the frequency (spacing), with which the light sources, etc. are arranged, by switching over the detection precision switching over signal. Furthermore an excellent effect can be obtained that a suitable load, depending on the field of utilization, is given to the host computer by controlling the detection precision switching over signal by means of the host computer, etc. The judgment and treatment of the coordinate data are carried out on the host computer side, corresponding to the outputted detection precision switching over signal.

Figure 3:
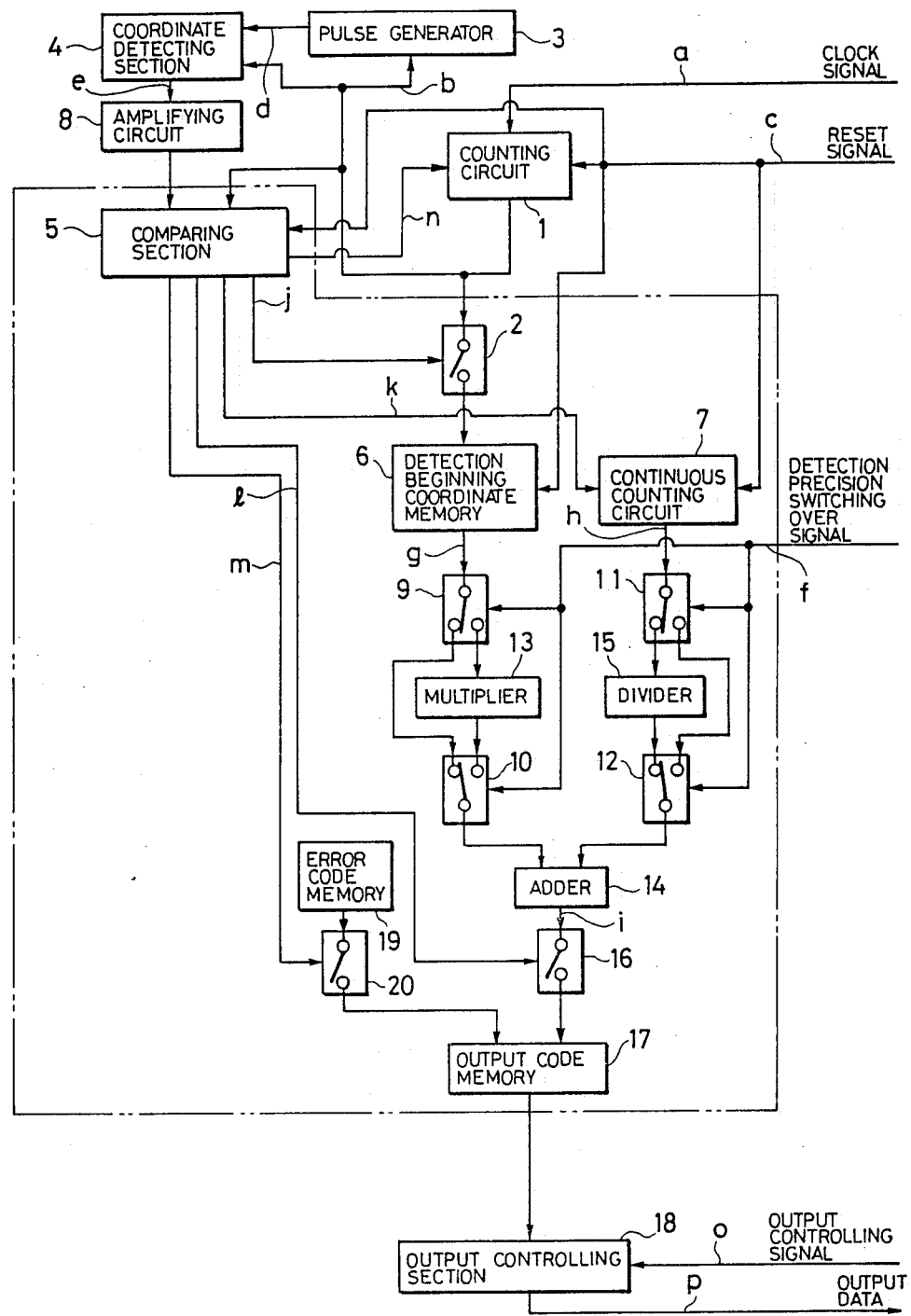
FIG. 3 is a block diagram illustrating the construction of the coordinate detecting device, which is a second embodiment of this invention.

Hereinbelow a second embodiment of this invention will be explained, referring to FIGS. 3 and 4. FIG. 3 is a block diagram illustrating the construction of the optical coordinate detecting device, which is a second embodiment of this invention, and FIG. 4 is a block diagram illustrating the construction of the comparing section in FIG. 3.

At first, the whole construction will be explained, referring to FIG. 3. In FIG. 3, a clock signal a is given by a host computer to a counting circuit 1. The counter value b of this counting circuit 1 is given to a switch 2, a pulse generator 3, a coordinate detecting section 4 and a comparing section 5. Further a reset signal c is given by the host computer to the counting circuit 1, the comparing section 5, a detection beginning coordinate memory 6 and a continuous counting circuit 7. A driving signal d is given by the pulse generator 3 to the coordinate detecting section 4 and a detection signal e is given through an amplifying circuit 8 to the comparing section 5. In addition, a detection precision switching over signal f is given to 4 switches 9, 10, 11, and 12 linked with each other. The counter value of the counting circuit 1 is given through the switch 2 to the detection beginning coordinate memory 6 and the counter value g stored in the detection beginning coordinate memory 6 is given through the switch 9 to the switch 10 directly or through a multiplier 13 multiplying a factor 2 and inputted through this switch 10 to the adder 14. The counter value h of the continuous counting circuit 7 is given through the switch 11 to the switch 12 through a divider 15 dividing by a factor 2 or directly and further through this switch 12 to an adder 14. An operation value i of this adder 14 is given through a switch 16 to an output code memory 17; stored after having been transformed into a code; and further given to an output controlling section 18. Furthermore an error code is given by an error code memory 19 through a switch 20 to an output code memory 17 and stored there. A signal j is given by the comparing section 5 to the switch 2; a signal k to the continuous counting circuit 7; signal l and m to the switches 16 and 20, respectively; and a signal n to the counter 1. Furthermore an output controlling signal p is given by the host computer to the output controlling section and output data q are given to the host computer.

Figure 4:
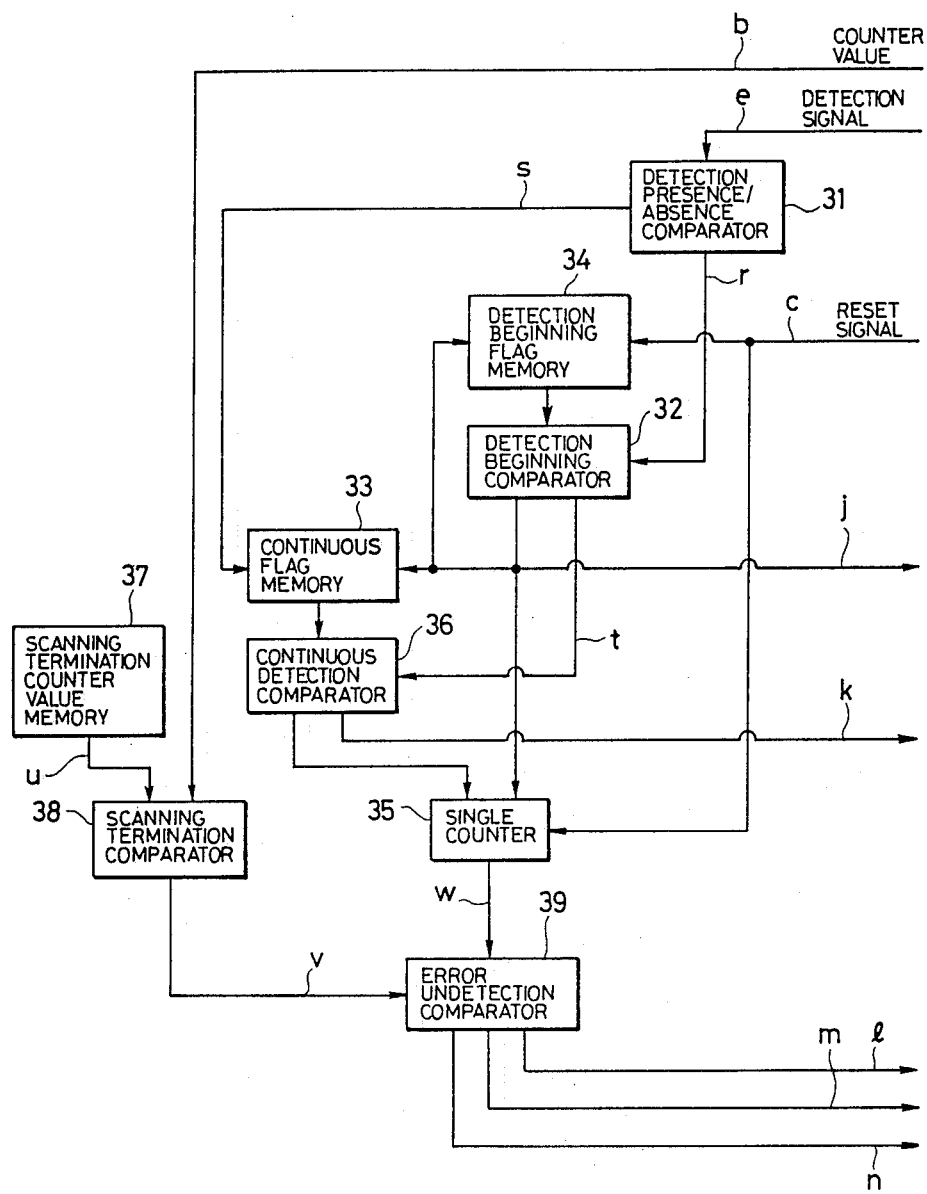
FIG. 4 is a block diagram illustrating the construction of the comparing section in FIG. 3.

Now the comparing section 5 is explained, referring to FIG. 4. In FIG. 4, the detection signal e is given to a detection presence/absence comparator 31, which is detection presence/absence judging means. If the detection signal exists, a signal r is given to a detection beginning comparator 32 and if not, a signal s is given to a continuous flag memory 33. The detection beginning comparator 32 judges whether a detection beginning flag memory 34 is in the set state or the reset state. If it is in the reset state, the detection beginning flag memory 34 and the continuous flag memory 33 are put in the set state; the content of a single counter 35, which is counting means, is increased by 1; and at the same time a signal j to close temporarily the switch 2 is outputted and if it is in the set state, a signal t is given to a continuous detection comparator 36. The continuous detection comparator 36, to which this signal t has been given, judges whether the continuous flag memory 33 is in the reset state or in the set state. If it is in the reset state, the content of the single counter 35 is increased by 1 and if it is in the set state, the signal k is given to the continuous counting circuit 7.

Furthermore a counter value, with which one scan is terminated, is previously stored in a scan termination counter value memory 37 and the scan termination counter value u is given to a scan termination comparator 38. The counter value b is given to this scan termination comparator 38. If the scan termination counter value u and the counter value b are in accordance with each other, a signal v is given to an error undetection comparator 39, which is controlling means. The scan termination counter memory 37 and the scan termination comparator 38 constitute a scanning termination judging means. The error undetection comparator 39, to which the signal v is given, gives the signal n to the counting circuit 1 when a counter value v of the single counter 35 is "0", the signal l to the switch 16 connected with the adder 14 when it is "1", and the signal m to the switch 20 connected with the error code memory 19 when it is "not smaller than 2", and thus closes temporarily either one of the switches 16 and 20. This error undetection comparator 39 and a single counter 35 constitute operation controlling means. In addition the reset signal c is given to the detection beginning flag memory 34 and the single counter 35.

The operation of the circuit having such a construction is as follows. When the reset signal c is released, the counting circuit 1 begins to count and at the same time the light sources are driven one after another in the coordinate detecting section 4 so that scanning is started. Then, when a coordinate input operation is effected and the first detection signal e is given by the coordinate detecting section 4 to the comparing section 5, the detection presence/absence comparator 31 drives the detection beginning comparator 32. Here the detection beginning flag memory 34 is in the reset state; the signal j is outputted so that the detection beginning flag memory 34 and the continuous flag memory 33 are put in the set state; the content of the single counter 35 is increased by 1; the switch 2 is closed temporarily; and the counter value of the counting circuit 1 is stored in the detection beginning coordinate memory 6. Subsequently, when the detection signal e is given to the comparing section 5, since the detection beginning flag memory 34 is in the set state, the detection beginning comparator 32 gives the continuous detection comparator 36 the signal t so as to drive it.

Since the continuous flag memory 33 is in the set state, this continuous detection comparator 36 gives the continuous counting circuit 7 the signal k. When detection signals e are continuously given to the comparing section 5, this signal k is given (the number of successive detection signals−1) times to the continuous counting circuit 7 and counted.

At this time, if for a certain scan no detection signal e is given to the comparing section 5, the content of the single counter 35 remains "0". Further, when only one detection signal e is given thereto, no signal k is outputted by the continuous detection comparator 36. Furthermore, in the case where in one scan the detection signal e is once interrupted and given two or more times to the comparator 5, since the signal s is given by the detection presence/absence comparator 31 to the continuous flag memory 33 and puts it in the reset state when the first detection signal e is interrupted, a signal to increase the content of the single counter 35 by 1 is given by the continuous detection comparator 36 on the basis of the succeeding detection signal e and thus the content of the single counter 35 becomes "not smaller than 2".

When one scan is terminated and the signal v is given to the error undetection comparator 39, either one of the signals l, m and n corresponding to the counter value of the single counter 35 is outputted.

Now, when the counter value g is given through the switches 9 and 10 directly to the adder 14 on the basis of the detection precision switching over signal f and at the same time the counter value h is given through the switches 11 and 12 to the adder 14 after having been divided by a factor 2 by means of the divider 15, the counter value g stored in the detection beginning coordinate memory 6 being A, the number of successive detection signals e being N, the operation value of the adder 14 being B, the counter value h or the continuous counting circuit 7 being (N−1), the following relationship is obtained:

$$B = A + \frac{(N-1)}{2}$$

By using this formula while counting fractions of 0.5 and over as a unit and cutting away the rest, the average value of the inputted coordinates, for which the detection signals e are successively obtained, can be calculated with a precision of the frequency (spacing), with which the light sources and the light sensitive elements are arranged.

In another scenario, when the counter value g is given through the switches 9 and 10 to the adder 14 after having been multiplied by a factor of 2 by means of the multiplier 13 on the basis of the detection precision switching over signal f and at the same time the counter value h is given through the switches 11 and 12 directly to the adder 14, the operation value of the adder 14 being B′, the following relationship is obtained:

$$B' = 2A + (N-1)$$

Here the operation value B represents coordinates set with a frequency (spacing) of the arrangement of the light sources, etc., corresponding to the light sources and the light sensitive elements and the operation value B′ represents coordinates set with a frequency (spacing)

of a half of that of the arrangement of the light sources, etc.

Furthermore, when the counter value of the single counter 35 is "1" and the signal 1 is outputted by the error undetection comparator 39, by closing the switch 16 the operation value i is given to the output code memory 17, coded, stored and further given to the output controlling section 18. When the counter value of the single counter 35 is "2" and the signal m is outputted by the error undetection comparator 39, by closing the switch 20 the error code is given by the error code memory 19 to the output code memory 17 and further to the output controlling section 18. Further, when the counter value of the single counter value of the single counter 35 is "0" and the signal n is outputted by the error undetection comparator 39 and given to the counting circuit 1. On the basis of this signal n, the counter value of the counting circuit 1 is once reset and at the same time the counting is again started.

Consequently, until a coordinate input operation is effected, every time one scan is terminated, the counting circuit 1 is reset and at the same time the automatic restarting of scanning is repeated. During this period of time no signal is outputted to the host computer, etc. and no external signals coming from the host computer, etc. are needed. When a coordinate input operation is effected, the operated average value of the inputted coordinates or the error code is given by the output controlling section 18 to the host computer, etc. as output data p, depending n the output controlling signal o coming from the host computer, etc.

The embodiment described above indicates a device, in which scanning is effected in the direction of one axis in order to detect the coordinate. In order to effect coordinate detection in X - Y coordinates, 2 of the block circuit enclosed by the dot-dashed line in FIG. 3 are required. In this case, scanning is effected by using one of the block circuits as the X-axis coordinate detecting device and when scanning by this block circuit is terminated, it is disabled. Then scanning is effected by using the other block circuit as the Y-axis coordinate detecting device.

As explained above, according to the coordinate detecting device, which is the second embodiment of this invention, since, until a coordinate input operation is effected, the device according to this invention repeats scanning by itself, and when a coordinate inputting operation is effected and an inputted coordinate is detected, the inputted coordinate is outputted, unless the coordinate input operation is effected, no signal is effected and therefore the host computer, etc. is not occupied Consequently, an excellent effect can be obtained during this period of time when the host computer, etc. can be utilized or a longer time for other purposes.

Figure 5:
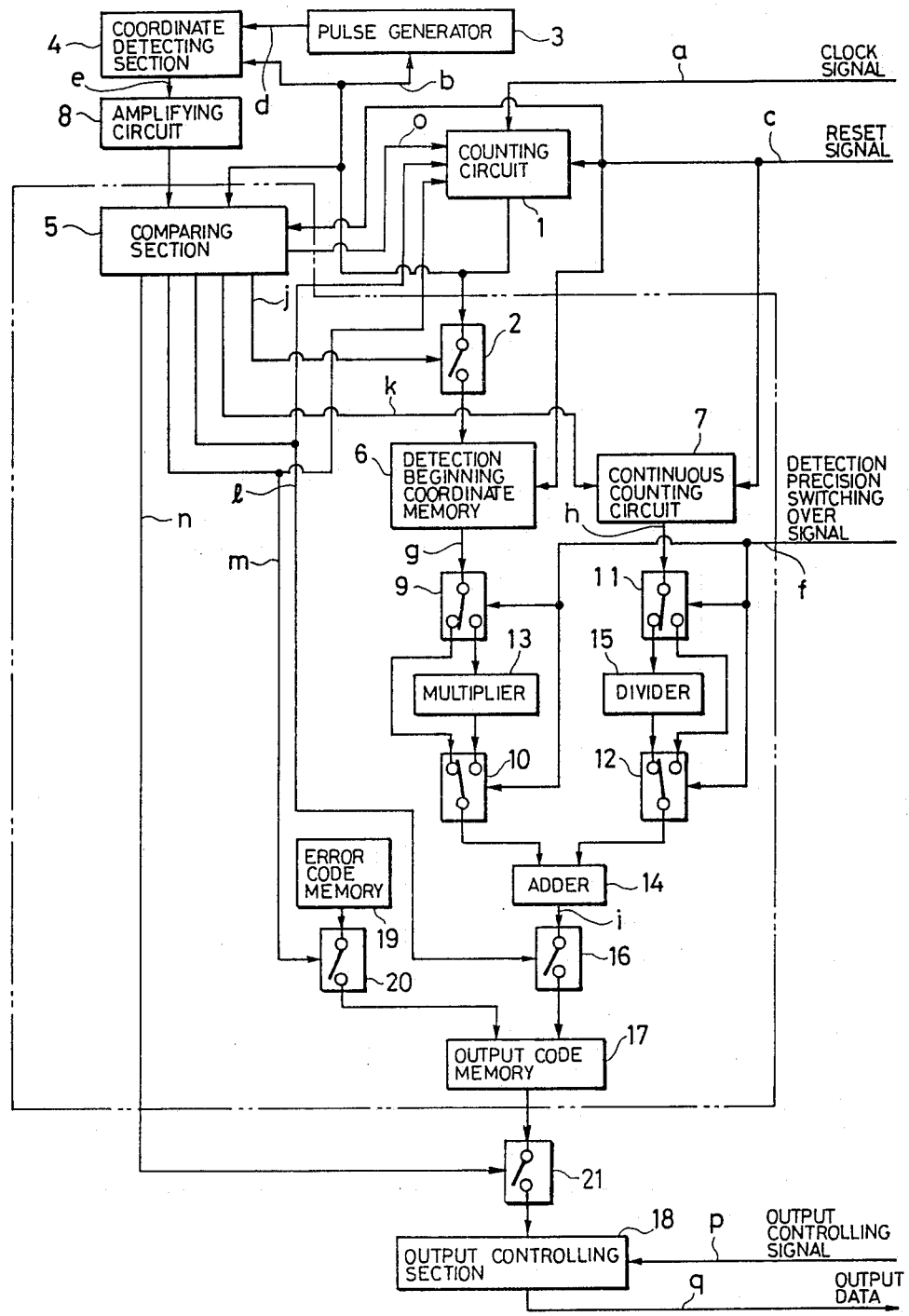
FIG. 5 is a block diagram illustrating the construction of the coordinate detecting device, which is a third embodiment of this invention.

Hereinbelow a third embodiment of this invention will be explained, referring to FIGS. 5 and 6. FIG. 5 is a block diagram illustrating the construction of the optical coordinate detecting device, which is a third embodiment of this invention, and FIG. 6 is a block diagram illustrating the construction of the comparing section in FIG. 5.

At first, the whole construction will be explained, referring to FIG. 5. In FIG. 5, a clock signal a is given by a host computer to a counting circuit 1. The counter value b of this counting circuit 1 is given to a switch 2, a pulse generator 3, a coordinate detecting section 4 and a comparing section 5. Further a reset signal c is given by the host computer to the counting circuit 1, the comparing section 5, a detection beginning coordinate memory 5 and a continuous counting circuit 7. A driving signal d is given by the pulse generator 3 to the coordinate detecting section 4 and a detection signal e is given through an amplifying circuit 8 to the comparing section 5. In addition, a detection precision switching over signal f is given to 4 switches 9, 10, 11, and 12 linked with each other. The counter value of the counting circuit 1 is given through the switch 2 to the detection beginning coordinate memory 6 and the counter value g stored in the detection beginning coordinate memory 6 is given through the switch 9 to the switch 10 directly or through a multiplier 13 multiplying a factor 2 and given through this switch 10 to the adder 14. The counter value h of the continuous counting circuit 7 is given through the switch 11 to the switch 12 through a divider 15 dividing by a factor 2 or directly and further through this switch 12 to an adder 14. An operation value i of this adder 14 is given through a switch 16 to an output code memory 17, which is a coordinate memory means, and stored after having been transformed into a code. Furthermore an error code is given by an error code memory 19 through a switch 20 to an output code memory 17 and stored therein. In addition the output is given through a switch 23 to an output controlling section 18. A signal j is given by the comparing section 5 to the switch 2; a signal k to the continuous counting circuit 7; signals l, m and x to the switches 16, 20 and 21, respectively; and a signal z to the counting circuit 1. In addition, an output controlling signal p is given by the host computer to an output controlling section 18 and output date q are given to the host computer.

Figure 6:
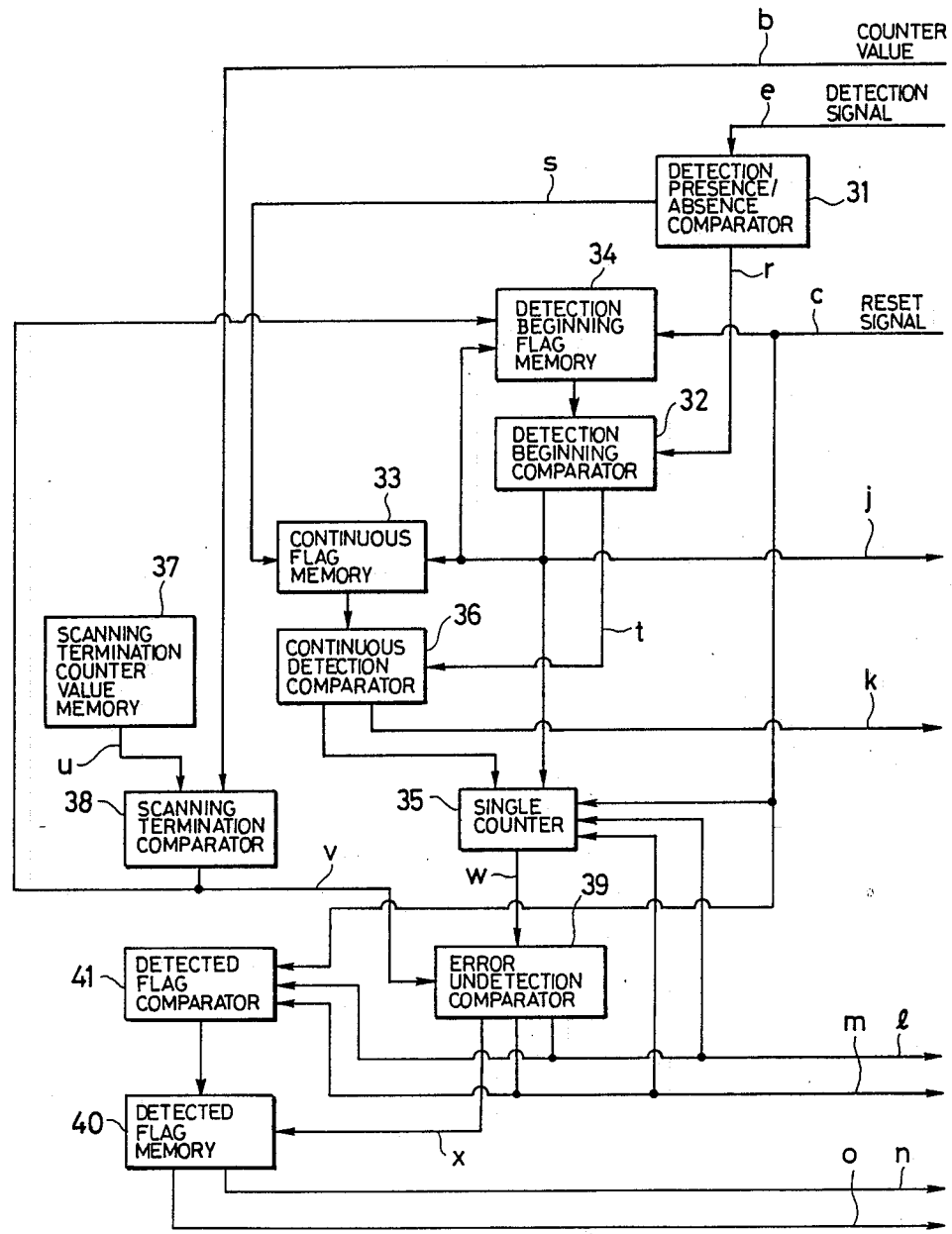
FIG. 6 is a block diagram illustrating the construction of the comparing section in FIG. 5 and FIG. 7.

Now the comparing section 5 is explained, referring to FIG. 6. In FIG. 6, the detection signal e is given to a detection presence/absence comparator 31, which is detection presence/absence judging means. If the detection signal exists for one scan, a signal r is given to a detection beginning comparator 32 and if not, a signal s is given to a continuous flag memory 33. The detection beginning comparator 32 judges whether a detection beginning flag memory 34 is in the set state or the reset state. If it is in the reset state, the detection beginning flag memory 34 and the continuous flag memory 33 are put in the set state; the content of a single counter 35 is increased by 1; and at the same time a signal j closing temporarily the switch 2 is outputted and if it is in the set state, a signal t is given to a continuous detection comparator 36. The continuous detection comparator 36, to which this signal t has been given, judges whether the continuous flag memory 33 is in the reset state or in the set state. If it is in the reset state, the content of the single counter 35 is increased by 1 and if it is in the set state, the signal k is given to the continuous counting circuit 7.

Furthermore a counter value, with which a scan is terminated, is previously stored in a scan termination counter value memory 37 and the scan termination counter value u is given to a scan termination comparator 38. The counter value b is given to this scan termination comparator 38. If the scan termination counter value u and the counter value b are in accordance with each other, a signal v is given to an error undetection comparator 39 and the detection beginning flag memory 34. The scan termination counter value memory 37 and the scan termination comparator 38 constitute scan termination judging means. The error undetection comparator 39, to which the signal v is given, gives a signal n to a detection flag comparator 41 when a counter value w of the single counter 35 is "0", the signal l to the switch 16 connected with the adder 14, the counting circuit 1, the single counter 35 and the detection flag memory 40 when it is "1", and the signal m to the switch 20 connected with the error code memory 19, the counting circuit 1, the single counter 35 and the detection flag memory 40 when it is "not smaller than 2". Further, depending on the state of the detection flag memory 40, the detection flag comparator 41 gives the signal x to the switch 21 or the signal z to the counting circuit 1. This detection flag memory 40 constitutes detection signal memory means, and the single counter 35, the error undetection comparator 39 and the detection flag comparator 41 constitute operation controlling means. In addition the reset signal c is given to the detection beginning flag memory 34 and the single counter 35.

The operation of the circuit having such a construction is as follows. When the reset signal c is released, the counting circuit 1 begins to count and at the same time the light sources are driven one after another in the coordinate detecting section 4 so that scanning is started. Then, when a coordinate inputting operation is effected and the first detection signal e is given by the coordinate detecting section 4 to the comparing section 5, the detection presence/absence comparator 31 drives the detection beginning comparator 32. Here the detection beginning flag memory 34 is in the reset state; the signal j is outputted so that the detection beginning flag memory 34 and the continuous flag memory 33 are put in the set state; the content of the single counter 35 is increased by 1; the switch 2 is closed temporarily; and the counter value of the counting circuit 1 is stored in the detection beginning coordinate memory 6. For one scan subsequent, when the detection signal e is given to the comparing section 5, since the detection beginning flag memory 34 is in the set state, the detection beginning comparator 32 gives the continuous detection comparator 36 the signal t so as to drive it. Since the continuous flag memory 33 is in the set state, this continuous detection comparator 36 gives the continuous counting circuit 7 the signal k. When detection signals e are continuously given to the comparing section 5, this signal k is given (the number of successive detection signals—1) times to the continuous counting circuit 7 and counted.

At this time if for a certain scan, no detection signal e is given to the comparing section 5, the content of the single counter 35 remains "0". Further, when only detection signal e is given thereto, the content of the single counter 35 becomes "1" and no signal k is outputted by the continuous detection comparator 36. Furthermore, in the case where for one scan the detection signal e is once interrupted and given two or more times to the comparator 5, since the signal s is given by the detection presence/absence comparator 31 to the continuous flag memory 33 and puts it in the reset state when the first detection signal e is interrupted, a signal to increase the content of the single counter 35 by 1 is given by the continuous detection comparator 36 on the basis of the succeeding detection signal e and thus the content of the single counter 35 becomes "not smaller than 2".

Now, when the counter value g is given through the switches 9 and 10 directly to the adder 14 on the basis of the detection precision switching over signal f and at the same time the counter value h is given through the switches 11 and 12 to the adder 14 after having been divided by a factor 2 by means of the divider 15, the counter value g stored in the detection beginning coordinate memory 6 being A, the number of successive detection signals e being N, the operation value of the adder 14 being B, the counter value h of the continuous counting circuit 7 being (N−1), the following relationship is obtained:

$$B = A + \frac{(N-1)}{2}$$

By using this formula while counting fractions of 0.5 and over as a unit and cutting away the rest, the average value of the inputted coordinates, for which the detection signals e are successively obtained, can be calculated with a precision of the frequency (spacing), with which the light sources and the light sensitive elements are arranged.

In another scenario, when the counter value g is given through the switches 9 and 10 to the adder 14 after having been multiplied by a factor 2 by means of the multiplier 13 on the basis of the detection precision switching over signal f and at the same time the counter value h is given through the switches 11 and 12 directly to the adder 14, the operation value of the adder 14 being B′, the following relationship is obtained:

$$B' = 2A + (N-1)$$

Here the operation value B represents coordinates set with a frequency (spacing) of the arrangement of the light sources, etc., corresponding to the light sources and the light sensitive elements and the operation value B′ represents coordinates set with a frequency (spacing) of a half of that of the arrangement of the light sources, etc.

For the scanning effected by releasing the reset signal c, when no coordinate inputting operation is effected and no detection signal is outputted, the content of the single counter 35 is "0" and when the signal v is outputted by the scan termination comparator 38, the error undetection comparator 39 gives the detection flag comparator 41 the signal n. In addition the detection beginning flag memory 34 is reset by the signal v. Since the detection flag memory 40 is in the reset state, the detection flag comparator 41 gives the counter 1 the signal z so as to reset it, and when it is detected, then one of the switches 16 or 20 is closed so that the memory in the output code memory 17 is rewritten.

Furthermore, if no detection signal is detected by the renewed scanning, the error undetection comparator 39, to which the signal v is given, gives the detection flag comparator 41 the signal n. This detection flag comparator 41 judges that the detection flag memory 40 is in the set state and gives the switch 21 the signal x so as to close it temporarily so that the memory stored in the output code memory 17 is given to the output controlling section 18. Then the output data q is given by the output controlling section 18 to the host computer, depending on the output controlling signal p coming from the host computer.

The embodiment described above indicates a device, in which scanning is effected in the direction of one axis in order to detect the coordinate. In order to effect coordinate detection in X - Y coordinates, 2 of the block circuit enclosed by the dot-dashed line in FIG. 5 are required. In this case scanning is effected by using one of the block circuits as the X-axis coordinate detecting device and when scanning by this block circuit is terminated, it is disabled. Then scanning is effected by using the other block circuit as the Y-axis coordinate detecting device.

As explained above, according to the coordinate detecting device, which is the third embodiment of this invention, since until a coordinate inputting operation is effected and until the coordinate input operation is effected and this operation is released, the device according to this invention repeats scanning by itself and when the coordinate inputting operation is released, only the inputted coordinate last detected is outputted, it is possible to effect precise coordinate input, if the input position at the moment of the release of the coordinate inputting operation is correct. Further, since, until a coordinate inputting operation is effected and this operation is released, no signal is outputted, the period of time when the host computer etc. is occupied is short and thus an excellent effect can be obtained during this period of time when the host computer etc. can be used for a longer time for other purposes.

Figure 7:
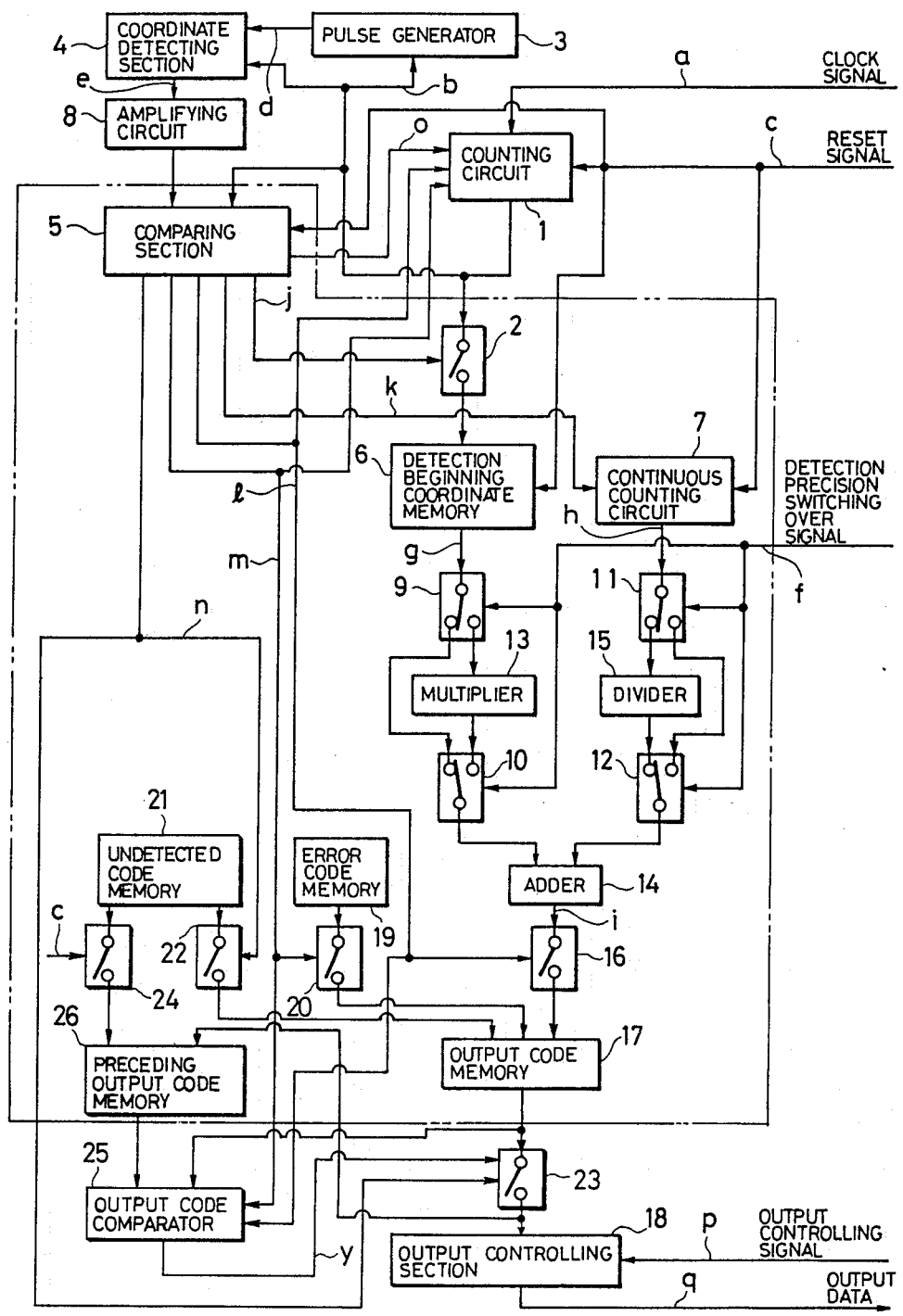
FIG. 7 is a block diagram illustrating the construction of the coordinate detecting device, which is a fourth embodiment of this invention.
Figure 8:
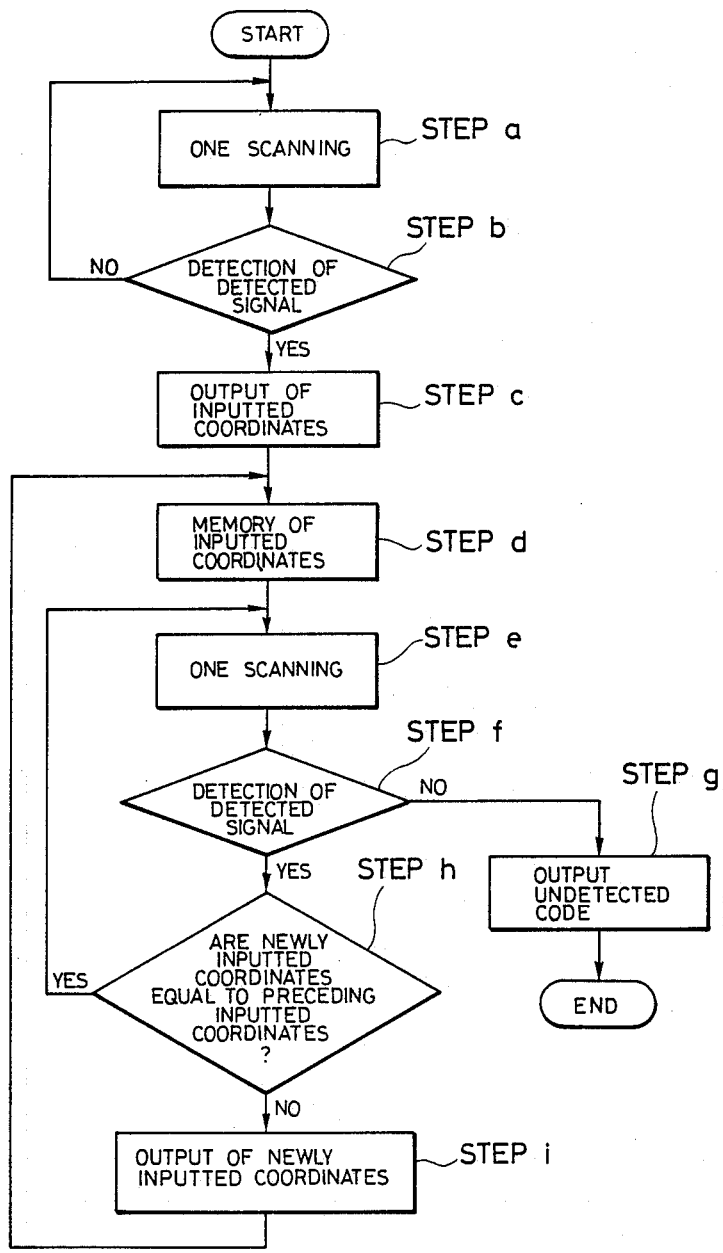
FIG. 8 is a flow chart for explaining the operation of the circuit indicated in FIG. 7.

Hereinbelow a fourth embodiment of this invention will be explained, referring to FIGS. 6 to 8. FIG. 7 is a block diagram illustrating the construction of the optical coordinate detecting device, which is an embodiment of this invention; FIG. 6 is a block diagram illustrating the construction of the comparing section in FIG. 7; and FIG. 8 is a flow chart for explaining the operation of the device indicated in FIG. 7.

At first, the whole construction will be explained, referring to FIG. 7. In FIG. 7, a clock signal a is given by a host computer to a counting circuit 1. The counter value b of this counting circuit 1 is given to a switch 2, a pulse generator 3, a coordinate detecting section 4 and a comparing section 5. Further a reset signal c is given by the host computer to the counting circuit 1, the comparing section 5, a detection beginning coordinate memory 6, a continuous counting circuit 7 and a switch 24. A driving signal d is given by the pulse generator 3 to the coordinate detecting section 4 and a detection signal e is given through an amplifying circuit 8 to the comparing section 5. In addition, a detection precision switching over signal f is given to 4 switches 9, 10, 11, and 12 linked with each other. The counter value of the counting circuit 1 is given through the switch 2 to the detection beginning coordinate memory 6 and the counter value g stored in the detection beginning coordinate memory 6 is given through the switch 9 to the switch 10 directly or through a multiplier 13 multiplying a factor 2 and given through the switch 10 to the adder 14. The counter value h of the continuous counting circuit 7 is given through the switch 11 to the switch 12 through a divider 15 dividing by a factor 2 or directly and further through this switch 12 to an adder 14. An operation value i of the adder 14 is given through a switch 16 to an output code memory 17, which is coordinate memory means; and stored after having been transformed into a code Further an error code is given by an error code memory 19 through a switch 20 to the output code memory 17 and stored therein and on the other hand an undetection code is given by an undetection code memory 21 through a switch 22 to the output code memory 17 and stored therein. Then the output of the output code memory 17 is given through the switch 23 to the output controlling section 18. A signal j is given by the comparing section 5 to the switch 2; a signal k to the continuous counting circuit 7; a signal l to the counting circuit 1, the switch 16 and the output code comparator 25; a signal m to the counting circuit 1, the switch 20 and the output code comparator 25; a signal x to the switches 22 and 23; and a signal z to the counting circuit 1. An undetection code of the undetection code memory 21 is given through a switch 24 to a preceding output code memory 26 and further the output of the output code memory 17 is given through the switch 23 thereto and stored therein. Then the output of the preceding output code memory 26 and the output of the output code memory 17 are given to an output code comparator 25 and an output signal y thereof is given to the switch 23. Furthermore an output controlling signal p is given by the host computer to the output controlling section 18 and output data q are given to the host computer.

Now the comparing section 5 is explained, referring to FIG. 6. In FIG. 6, the detection signal e is given to a detection presence/absence comparator 31. If the detection signal exists, a signal r is given to a detection beginning comparator 32 and if not, a signal s is given to a continuous flag memory 33. The detection beginning comparator 32 judges whether a detection beginning flag memory 34 is in the set state or the reset state. If it is in the reset state, the detection beginning flag memory 34 and the continuous flag memory 33 are put in the set state; the content of a single counter 35 is increased by 1; and at the same time a signal j to close temporarily the switch 2 is outputted and if it is in the set state, a signal t is given to a continuous detection comparator 36. The continuous detection comparator 36, to which this signal t has been given, judges whether the continuous flag memory 33 is in the reset state or in the set state. If it is in the reset state, the content of the single counter 35 is increased by 1 and if it is in the set state, the signal k is given to the continuous counting circuit 7.

Furthermore a counter value, with which a scan is terminated, is previously stored in a scan termination counter value memory 37 and the scan termination counter value u is given to a scan termination comparator 38. The counter value b is given to this scan termination comparator 38. If the scan termination counter value u and the counter value b are in accordance with each other, a signal v is given to an error undetection comparator 39. The error undetection comparator 39, to which the signal v is given, gives the detection flag comparator 41 the signal n when a counter value w of the single counter 35 is "0", the switch 16 connected with the adder 14, the counter circuit 1, the single counter 35, the output code comparator 25 and the detection flag memory 41 the signal l when it is "1", and the switch 20 connected with the error code memory 19, the counter circuit 1, the single counter 35, the output code comparator 25 and the detection flag memory 40 the signal m when it is "not smaller than 2". Further, depending on the state of the detection flag memory 40, the detection flag comparator 41 gives the switches 22 and 23 the signal x, or the counting circuit 1 the signal z. In addition the reset signal c is given to the detection beginning flag memory 34 and the single counter 35.

The operation of the circuit having such a construction will be explained below, referring to FIG. 8. When the reset signal c is released, the counting circuit begins to count and at the same time the light sources are driven one after another in the coordinate detecting section 4 so that scanning is started (Step a in FIG. 8). Then, when a coordinate input operation is effected and the first detection signal e is given by the coordinate detecting section 4 to the comparing section 5, the detection presence/absence comparator 31 drives the detection beginning comparator 32. Here the detection beginning flag memory 34 is in the reset state; the signal j is outputted so that the detection beginning flag memory 34 and the continuous flag memory 33 are put in the set state; the content of the single counter 35 is increased by 1 so that it becomes "1"; the switch 2 is closed temporarily; and the counter value of the counting circuit 1 is stored in the detection beginning coordinate memory 6. Subsequently, when the detection signal e is given by one scan to the comparing section 5, since the detection beginning flag memory 34 is in the set state, the detection beginning comparator 32 gives the continuous detection comparator 36 the signal t so as to drive it. Since the continuous flag memory 33 is in the set state, this continuous detection comparator 36 gives the continuous counting circuit 7 the signal k. When detection signals e are continuously given to the comparing section 5, this signal k is given (the number of successive detection signals − 1) times to the continuous counting circuit 7 and counted.

At this time, if for one scanning no detection signal e is given to the comparing section 5, the content of the single counter 35 remains to be "0". Further, when only one detection signal e is given thereto, the content of the single counter 25 becomes "1" and no signal k is outputted by the continuous detection comparator 36. Furthermore, in the case where for one scan the detection signal e is once interrupted and given two or more times to the comparator 5, since the signal s is given by the detection presence/absence comparator 31 to the continuous flag memory 33 and puts it in the reset state when the first detection signal e is interrupted, a signal to increase the content of the single counter 35 by 1 is given by the continuous detection comparator 36 on the basis of the succeeding detection signal e and thus the content of the single counter 35 becomes "not smaller than 2".

Now, when the counter value g is given through the switches 9 and 10 directly to the adder 14 on the basis of the detection precision switching over signal f and at the same time the counter value h is given through the switches and 12 to the adder 14 after having been divided by a factor 2 by means of the divider 15, the counter value g stored in the detection beginning coordinate memory 6 being A, the number of successive detection signals e being N, the operation value of the adder 14 being B, the counter value h of the continuous counting circuit 7 being (N−1), the following relationship is obtained:

$$B = A + \frac{(N-1)}{2}$$

By using this formula while counting fractions of 0.5 and over as a unit and cutting away the rest, the average value of the inputted coordinates, for which the detection signals e are successively obtained, can be calculated with a precision of the frequency (spacing), with which the light sources and the light sensitive elements are arranged.

In another scenario, when the counter value g is given through the switches 9 and 10 to the adder 14 after having been multiplied by a factor 2 by means of the multiplier 13 on the basis of the detection precision switching over through the switches 11 and 12 directly to the adder 14, the operation value of the adder 14 being B', the following relationship is obtained:

$$B'2A+(N-1)$$

Here the operation value B represents coordinates set with a frequency (spacing) of the arrangement of the light sources, etc. corresponding to the light sources and the light sensitive elements and the operation value B' represents coordinates set with a frequency (spacing) of a half of that of the arrangement of the light sources, etc.

For the scanning effected by releasing the reset signal c, when no coordinate inputting operation is effected and no detection signal is outputted, the content of the single counter 35 is "0" and when the signal v is outputted by the scan termination comparator 38, the error undetection comparator 39 gives the detection flag comparator 41 the signal n. In addition the detection beginning flag memory 34 is reset by the signal v. Since the detection flag memory 40 is in the reset state, the detection flag comparator 41 gives the counter 1 the signal z so as to reset it and to make it start the counting. Consequently, scanning is repeated, until the detection signal is detected (Step b in FIG. 8). Here the switches 22 and 23 remain to be closed and no signal is outputted to the output controlling section 18. Further the switch 24 is closed by the reset signal c and the undetection code is stored in the preceding output code memory 26.

When the detection signal is outputted, the counter value of the single counter 35 becomes "1" or "not smaller than 2". Here, when a scan is terminated and the signal v is given to the error detection comparator 39, if the counter value of the single counter 35 is "1", the signal l is outputted; the switch 16 is closed temporarily; the operation value i of the adder 14 is stored in the output code memory 17; at the same time the single counter is put in the reset state; the detection flag memory 40 is put in the set state; further the counting circuit 1 is reset and at the same time starts counting; and the output code comparator 25 is driven. Here the undetection code stored in the preceding output code memory 26 and the inputted coordinate corresponding to the operation value i stored in the output code memory 17 are given to the output code comparator 25 and when it is judged that they are different, the signal y is given to the switch 23. This switch 23 is closed temporarily by the signal y and the inputted coordinate is given from the output code memory 17 to the output controlling section 18. It is then outputted by the output controlling signal p to the host computer as the output data (Step c in FIG. 8). Further the memory stored in the preceding output code memory 26 is rewritten by the inputted coordinate given to the output controlling section 18 (Step d in FIG. 8). Similarly, when the counter value of the single counter 35 is "not smaller than 2", the signal m is outputted and the error code is outputted. The error code is stored in the preceding output code memory 26.

Furthermore, on the basis of these signals l and m, the counting circuit 1 starts counting again and scanning is effected (Step e in FIG. 8). If no detection signal e is detected by this renewed scanning (Step f in FIG. 8), since the detection flag memory 40 is in the set state, the signal x is outputted by the detection flag comparator 41; the switches 22 and 23 are closed; the undetection code outputted by the undetection code memory 21 is given through the output code memory 17 to the output controlling section 18 and outputted (Step g in FIG. 8); and finally the operation is terminated. Further, when the detection signal e is detected by the renewed scanning (Step f in FIG. 8), the newly inputted coordinated or the error code is given to the output code memory 17 and further to the output code comparator 25. Then it is judged whether the newly inputted coordinate, etc. obtained by the scan at the time and the preceding inputted coordinate, etc. obtained by the preceding scan and stored in the preceding output code memory 26 are in accordance with each other (Step h in FIG. 8). If they are in accordance with each other, no signal y is outputted and the switch 23 is not closed, and no coordinate is outputted; the counting circuit 1 is started counting again by the signal 1 or m and scanning is repeated (Step e in FIG. 8). In another scenario, if the newly inputted coordinate, etc. differs from the preceding inputted coordinate, etc., the signal y is outputted by the output code comparator 25; the switch 23 is closed; the newly inputted coordinate is given by the output code memory 17 to the output controlling section 18 and outputted (Step i in FIG. 8). Furthermore the memory stored in the preceding output code memory 26 is rewritten (Step d in FIG. 8) and at the same time scanning is repeated (Step e in FIG. 8).

Consequently, if the coordinate inputting operation is continued and the detection signal e is detected successively for every scan, the inputted coordinate, which is the same as that obtained by the preceding scanning, is not outputted in duplicate. In another scenario, if the position of the inputted coordinate is displaced and the inputted coordinate differs from that obtained by the preceding scanning, it is outputted. As a result, only the inputted coordinates necessary for tracing the trajectory of coordinate inputting operation are outputted.

The embodiment described above indicates a device, in which scanning is effected in the direction of one axis in order to detect a coordinate. In order to effect coordinate detection in X - Y coordinates, 2 of the block circuit enclosed by the dot-dashed line in FIG. 7 are required. In this case scanning is effected by using one of the block circuits as the X-axis coordinate detecting device and when scanning by this block circuit is terminated, it is disabled. Then scanning is effected by using the other block circuit as the Y-axis coordinate detecting device.

As explained above, according to the coordinate detecting device, which is the fourth embodiment of this invention, since only the inputted coordinates necessary for tracing the trajectory of the coordinate inputting operation are outputted, an excellent result can be obtained in that the load of the host computer, etc. which treats these inputted coordinates, is reduced.

Figure 9:
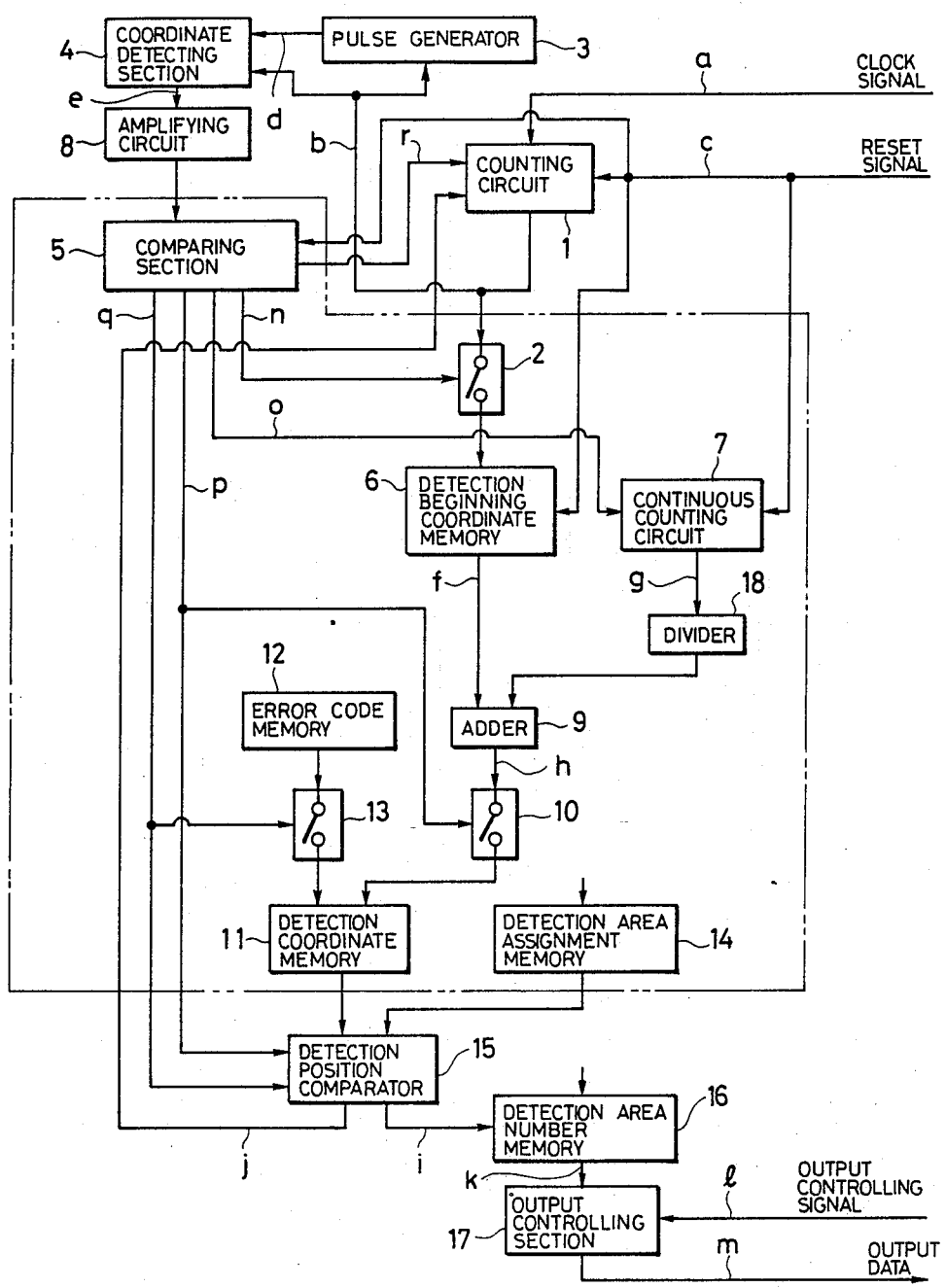
FIG. 9 is a block diagram illustrating the construction of the coordinate detecting device, which is a fifth embodiment of this invention.
Figure 10:
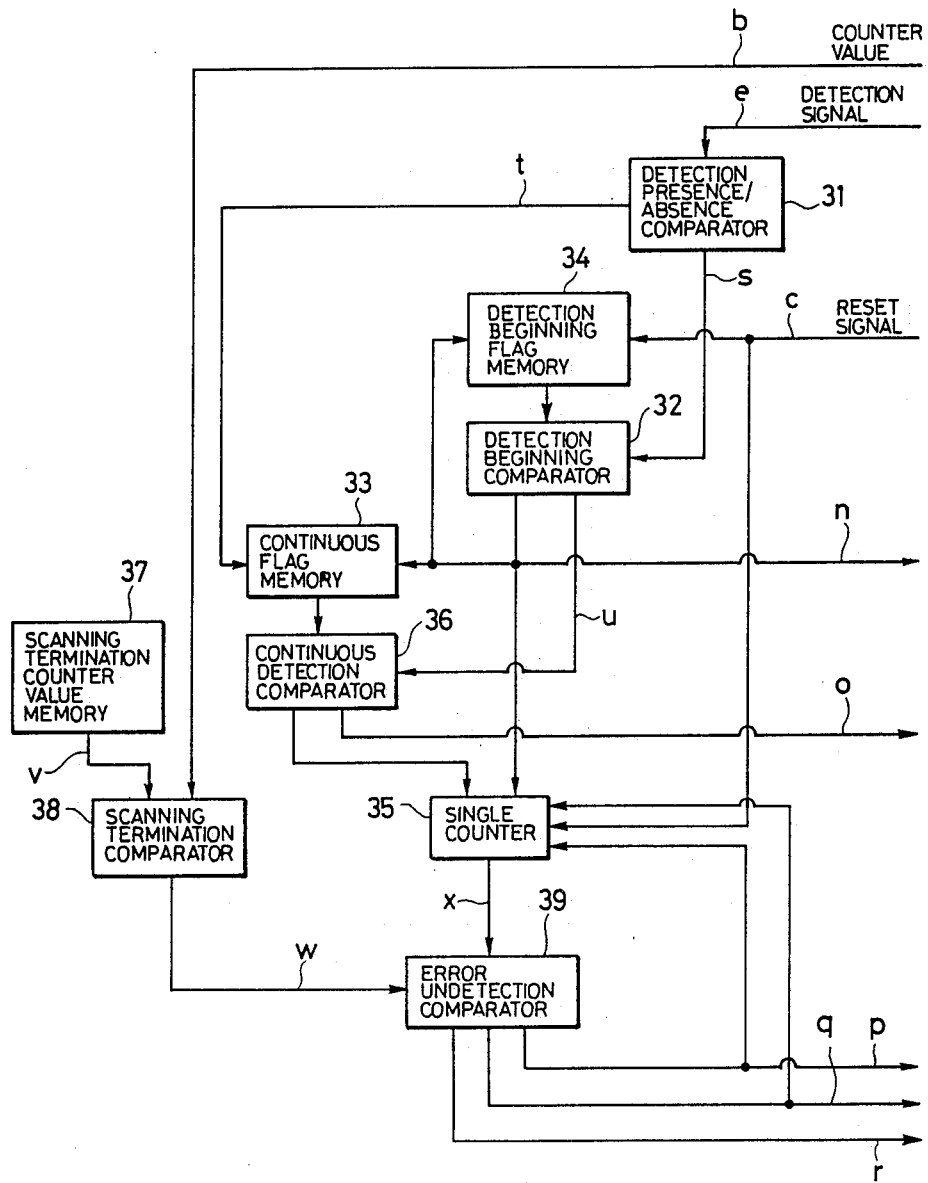
FIG. 10 is a block diagram illustrating the construction of the comparing section in FIG. 9.

Hereinbelow a fifth embodiment of this invention will be explained, referring to FIGS. 9 to 11. FIG. 9 is a block diagram illustrating the construction of the optical coordinate detecting device, which is an embodiment of this invention; FIG. 10 is a block diagram illustrating the construction of the comparing section in FIG. 9; and FIG. 11 is a flow chart for explaining the operation of the circuit indicated in FIG. 9.

At first, the whole construction will be explained, referring to FIG. 9. In FIG. 9, a clock signal a is given by a host computer to a counting circuit 1. The counter value b of this counting circuit 1 is given to a switch 2, a pulse generator 3, a coordinate detecting section 4 and a comparing section 5. Further a reset signal c is given by the host computer to the counting circuit 1, the comparing section 5, a detection beginning coordinate memory 6 and a continuous counting circuit 7. A driving signal d is given by the pulse generator 3 to the coordinate detecting section 4 and a detection signal e is given through an amplifying circuit 8 to the comparing section 5. In addition, the counter value of the counting circuit 1 is given through the switch 2 to the detection beginning coordinate memory 6 and the counter value g stored in the detection beginning coordinate memory 6 is given to an adder 14. The counter value h of the continuous counting circuit 7 is given through a divider 15 dividing by a factor 2 to an adder 14. An operation value i of this adder 14 is given through a switch 16 to a detection coordinate memory 27, transformed into a code, and at the same time stored therein. Furthermore an error code is given by an error code memory 19 through a switch 20 to the detection coordinate memory 27 and stored therein. Then the content stored in the detection coordinate memory 27 and the content of a detection area assignment memory 28 are given to a detection position comparator 29, which is a detection position judgment means; a signal aa is given by this detection position comparator 29 to a detection area number memory 30; and a signal bb is given the counting circuit 1. further a signal cc is given by the detection area number memory 30 to an output controlling section 18. In addition an output controlling signal p is given by the host computer to the output controlling section 18 and output data q is given to the host computer. Furthermore a signal j is given by the comparing section 5 to the switch 2; a signal k to the continuous counting circuit 7; a signal l to a switch 16 and the detection position comparator 29; a signal m to a switch 20 and the detection position comparator 29. Further, in the detection area assignment memory 28, a plurality of detection areas are previously assigned and stored; and in the detection area number memory 30, detection area numbers, corresponding to detection areas that have been previously set, are stored.

Now the comparing section 5 is explained, referring to FIG. 10. In FIG. 10, the detection signal e is given to a detection presence/absence comparator 31. If the detection signal e exists, a signal r is given to a detection beginning comparator 32 and if not, a signal s is given to a continuous flag memory 33. The detection beginning comparator 32 judges whether detection beginning flag memory 34 is in the set state or the reset state. If it is in the reset state, the detection beginning flag memory 34 and the continuous flag memory 33 are put in the set state; the content of a single counter 35 is increased by 1; and at the same time a signal j to close temporarily the switch 2 is outputted and if it is in the set state, a signal t is given to a continuous detection comparator 36. The continuous detection comparator 36, to which this signal t has been given, judges whether the continuous flag memory 33 is in the reset state or in the set state. If it is in the reset state, the content of the single counter 35 is increased by 1 and if it is in the set state, the signal k is given to the continuous counting circuit 7.

Furthermore a counter value, with which one scan is terminated, is previously stored in a scan termination counter value memory 37 and the scan termination counter value u is given to a scan termination comparator 38. The counter value b is given to this scan termination comparator 38. If the scan termination counter value u and the counter value b are in accordance with each other, a signal v is given to an error undetection comparator 39. The error undetection comparator 39, to which the signal v is given, gives the counting circuit 1 the signal n when a counter value w of the single counter 35 is "0", the switch 16 connected with the adder 14, the single counter 35 and the detection position comparator 29 the signal l when it is "1", and the switch 20 connected with the error code memory 19, the single counter 35 and the detection position comparator 29 the signal q when it is "not smaller than 2". In addition the reset signal c is given to the detection beginning flag memory 34 and the single counter 35.

The operation of the circuit having such a construction is as follows. When the reset signal c is released, the counting circuit 1 begins to count and at the same time the light sources are driven one after another in the coordinate detecting section 4 so that scanning is started. Then, when a coordinate input operation is effected and the first detection signal e is given by the coordinate detecting section 4 to the comparing section 5, the detection presence/absence comparator 31 drives the detection beginning comparator 32. Here the detection beginning flag memory 34 is in the reset state; the signal j is outputted so that the detection beginning flag memory 34 and the continuous flag memory 33 are put in the set state; the content of the single counter 35 is increased by 1; the switch 2 is closed temporarily; and the counter value of the counting circuit 1 is stored in the detection beginning coordinate memory 6. Subsequently, if during the same scan the detection signal e is given to the comparing section 5, since the detection beginning flag memory 34 is in the set state, the detection beginning comparator 32 gives the continuous detection comparator 36 the signal t so as to drive it. Since the continuous flag memory 33 is in the set state, this continuous detection comparator 36 gives the continuous counting circuit 7 the signal k. When detection signals e are continuously given to the comparing section 5, the signal k is given (the number of successive detection signals−1) times to the continuous counting circuit 7 and counted.

At this time, if for one scan no detection signal e is given to the comparing section 5, the content of the single counter 35 remains "0". Further, when only one detection signal e is given thereto, the content of the single counter 35 becomes "1" and no signal k is outputted by the continuous detection comparator 36. Furthermore, in the case where for one scan the detection signal e is once interrupted and given two or more times to the comparator 5, since the signal s is given by the detection presence/absence comparator 31 to the continuous flag memory 33 and puts it in the reset state when the first detection signal e is interrupted, a signal to increase the content of the single counter 35 by 1 is given by the continuous detection comparator 36 on the basis of the succeeding detection signal e and thus the content of the single counter 35 becomes "not smaller than 2".

When one scan is terminated and the signal v is given to the error undetection comparator 39, one of the signals l, m and n corresponding to the counter value of the single counter 35 is outputted.

Now, the counter value g stored in the detection beginning coordinate memory 6 being A, the number of successive detection signals e being N, the operation value of the adder 14 being B, the counter value h of the continuous counting circuit 7 being (N−1), the following relationship is obtained:

$$B = A + \frac{(N-1)}{2}$$

By using this formula while counting fractions of 0.5 and over as a unit and cutting away the rest, the average value of the inputted coordinates, for which the detection signals e are successively obtained, can be calculated with a precision of the frequency (spacing), with which the light sources and the light sensitive elements are arranged.

Furthermore, when the counter value of the single counter 35 is "1" and the signal l is outputted by the error undetection comparator 39, by closing the switch 16 the operation value i is given to the detection coordinate memory 27, coded and stored. The detection position comparator 29 judges in which detection area, set in the detection area assignment memory 28 this operation value i corresponds. When it is judged that the operation value i is in one of the detection areas, the signal aa is outputted and a relevant detection area number is read out from the detection area number memory 30, which number is given by the signal cc to the output controlling section 18. This detection area number is read out by the output controlling signal p coming from the host computer as output data q and outputted. In another instance, when it is judged by detection position comparator 29 that the operation value i given by the adder 14 to the detection coordinate memory 27 is not in any detection area, the signal bb is outputted; the counter circuit 1 is reset; counting is again started; and succeeding scanning is effected.

Furthermore, when the counter value of the single counter 35 is "not smaller than 2" and the signal m is outputted by the error undetection comparator 39, the error code is given to the detection coordinate memory 27 by closing switch 20 and stored therein. In addition this error code is compared with the location of the detection areas by the detection position comparator 29, but the error code never corresponds to any detection area and thus the signal bb is outputted. Then the succeeding scanning is effected by this signal bb. Further the single counter 35 is reset by the signals l and m in order to be prepared for the succeeding scan.

Furthermore, when the counter value of the single counter 35 is "0" and the signal n is outputted by the error undetection comparator 39, the counting circuit 1 reset by this signal n; at the same time counting is started and the succeeding scan is effected.

As described above, the coordinate detecting device according to the fifth embodiment of this invention works as follows. A detection area and a detection area number are set and stored in the detection area assignment memory 28 and the detection area number memory 30, respectively (Step ① in FIG. 11). When the reset signal c is released, the first scan is effected (Step ② in FIG. 11). Then it is judged by the comparing section 5 whether a detection signal e is detected as a result of this scan or not (Step ③ is FIG. 11). When it is not detected, the counting circuit 1 is reset by the signal n; at the same time the counting is restarted and scanning is repeated (Step ② in FIG. 11). In another instance, when a detection signal e is detected, it is judged by the detection position comparator 15 to determine in which detection area the inputted coordinate corresponding to this detection signal e is (Step ④ FIG. 11). When it is in one of the detection areas, the corresponding detection area number is outputted by the signal cc from the detection area number memory 30 (Step ⑤ FIG. 11) and the operation is terminated. In addition, when the inputted coordinate corresponding to the detection signal e is in none of the detection areas or an error code is detected, the counting circuit 1 is reset by the signal bb; counting is restarted and scanning is repeated (Step ② in FIG. 11).

The embodiment described above indicates a device, in which scanning is effected in the direction of one axis in order to detect the coordinate. In order to effect coordinate detection in X - Y coordinates, 2 of the block circuits enclosed by the dot-dashed line in FIG. 9 are required In this case scanning is effected by using one block circuit as the X-axis coordinate detecting device and when scanning by this block circuit is terminated, it is disabled. Then scanning is effected by the other block circuit as the Y-axis coordinate detecting device.

As explained above, according to the coordinate detecting device, which is the fifth embodiment of this invention, since, when a coordinate input operation is effected, the scanning is repeated, until an inputted coordinate in one of the detection areas is detected and when an inputted coordinate in one of the detection areas is detected, a detection area number corresponding to the relevant detection area is outputted, an effect that can be obtained so that the utilization of the host computer is significantly reduced with respect to that of these kinds of prior art devices, the time during which the host computer is occupied is shortened remarkably and thus it has more time available for other tasks.

It is a matter of course that a coordinate detecting device as described above can be used not only for devices, in which the coordinate detecting section is so constructed that the light emitting and receiving elements are arranged opposite to each other, but also for all sorts of sensor means which can detect coordinates on the basis of counting operations.

Furthermore it is a matter of design, which those skilled in the art can realize extremely easily, that the same effect can be obtained by dividing the principal construction of this coordinate detecting device and arranging a part thereof in a device on the output side.

The embodiments of the invention in which an exclusive property or privilege is claimed are defined as follows:

1. A coordinate detecting device comprising:
a counting circuit for providing at an output a series of counter values;
a coordinate detecting section having a counter receiving input for receiving counter values from said counting circuit and for effecting scanning of a plurality of sensing elements driven one after another depending on the counter value outputted by said counting circuit, and detecting a coordinate input operation on the basis of said counter values received from said counting circuit, including a means for providing at an output a detecting signal indicating the detection of a coordinate input operation;
means coupling the output of said counting circuit to said counter receiving input of said coordinate detecting section;
a detection beginning coordinate memory for storing the counter value of said counting circuit at the time a first detection signal is provided at said output of said coordinate detecting section, said detection beginning coordinate memory having an input terminal for receiving said counter value corresponding to said first detection signal, and means for providing at an output terminal a detection beginning coordinate memory output signal representative of said counter value stored therein;
control circuit means, including a control terminal, said control circuit means being coupled between said output of said counting circuit and said input of said detection beginning coordinate memory for selectively providing the counter value of said counting circuit to said detection beginning coordinate memory input terminal in response to receipt of a control signal at said control terminal;
a comparing circuit having an input coupled to the output of said coordinate detecting section, said comparing circuit including means for providing at a first output terminal, a control signal in response to receipt of the first detection signal from said coordinate detecting section, and said comparing circuit further including means for providing at a second output terminal a detecting sensing signal, each detection sensing signal representing receipt of a detection signal from said coordinate detecting section subsequent to the first detection signal;
means coupling said first output terminal of said comparing circuit to said control terminal of said control circuit means;
a continuous counting circuit, having an input coupled to said second output terminal of said comparing circuit for counting and storing the number of detection sensing signals received and providing at an output terminal a continuous counting circuit output signal representative of the sum of the number of detection sensing signals received from said comparing circuit;
coefficient processing means having a first input terminal coupled to said output terminal at said detecting beginning coordinate memory for receiving said detection beginning coordinate memory output signal and providing at a first output terminal a first coefficient processor output signal, and said coefficient processing means having a second input terminal coupled to said output terminal of said continuous counting circuit for receiving said continuous counting circuit output signal and providing at a second output terminal a second coefficient processor output signal, wherein said first coefficient processor output signal is a function of said detection beginning coordinate memory output signal and said second coefficient processor output signal is a function of said continuous counting circuit output signal according to a coefficient processing instruction; and
an adder circuit having first and second input terminals and an output terminal, with said first input terminal coupled to said first output terminal of said coefficient processing means and said second input terminal coupled to said second output terminal of said coefficient processing means, said adder circuit functioning to add said first coefficient processor output signal and said second coefficient processor output signal to provide at said adder output terminal a coordinate value.

2. A coordinate detecting device according to claim 1, wherein said coefficient processing means includes a first coefficient processing combination including connecting between said first input and said first output with multiplier circuitry and connecting between said second input and said second output with unity relationship circuitry, and a second coefficient processing combination including connecting between said first input and said first output with unity relationship circuitry and connecting between said second input and said second output with divider circuitry, wherein the selection of either the first or the second coefficient processing combination is controlled by said coefficient processing instruction.

3. A coordinate detecting device according to claim 2, wherein said coefficient processing means includes switching means controlled by said coefficient processing instruction.

4. A coordinate detecting device according to claim 1, wherein said coordinate detecting section includes light emitting elements and light sensitive elements, which are disposed opposite to each other and with a predetermined spacing.

5. A coordinate detecting device according to claim 1, wherein said coefficient processing means includes multiplier circuitry and said coefficient processing means operates in accordance with a first coefficient operating instructions wherein said multiplier circuitry is coupled between said first input of said coefficient processing means and said first output of said coefficient processing means whereby said first coefficient processor output signal has a magnitude which is a product of the multiplication of said detection beginning coordinate memory output signal and a predetermined value, and further wherein said coefficient processing means includes circuitry providing a unity relationship between the magnitude of said continuous counting circuit output signal and said second coefficient processor output signal.

6. A coordinate detecting device according to claim 1, wherein said coefficient processing means includes divider circuitry and said coefficient processing means operates in accordance with a second coefficient operating instruction wherein said divider circuitry is coupled between said second input of said coefficient processing means and said second output of said coefficient processing means whereby said second coefficient processor output signal has a magnitude which is a quotient of the division of the continuous counting circuit output signal by a predetermined value, and further wherein said coefficient processing means includes circuitry providing a unity relationship between the magnitude of said detection beginning coordinate memory output signal and said first coefficient processor output signal.

7. A coordinate detecting device comprising:
a counting circuit for providing at an output a series of counter values, said counting circuit including a reset signal input terminal and including circuit means to reset said counter upon receipt of a reset signal at said reset terminal;
a coordinate detecting section having an input for receiving counter values from said counting circuit and for effecting scanning of a plurality of sensing elements driven one after another depending on the counter value outputted by said counting circuit, and detecting a coordinate input operation on the basis of said counter values received from said counting circuit, said coordinate detecting section including means for providing at an output a detection signal indicating the detection of a coordinate input operation;
means coupling the output of said counting circuit to the input of said coordinate detecting section;

scan termination judging means having an input for receiving counter values from said counting circuit and including means for judging the termination of a scan on the basis of said counter values received from said counting circuit, and means for providing at an output a scan termination signal at a time when a scan is judged to be terminated;
means coupling the output of said counting circuit to said counter receiving input of said scan termination judging means;
detection presence/absence judging means having an input for receiving detection signals from said coordinate detecting section and including means for detecting the receipt of a detection signal and providing at an output a detection presence/absence signal which indicates that a coordinate input operation has been performed;
means coupling the output of said coordinate detecting section to the input of said detection presence/absence judging means;
detection presence/absence signal processing means, having an input coupled to said output of said detection presence/absence judging means for receiving detection presence/absence signals, said detection presence/absence signal processing means including circuit means for providing at a first output terminal a detection sensing signal indicating receipt of at least one detection presence/absence signal, said detection presence/absence signal processing means further including circuit means for providing, at a second output terminal a series sensing signal in response to receipt of a series of one or more uninterrupted detection presence/absence signals from said detection presence/absence judging means;
coordinate value obtaining means having an input coupled to the output of said counting circuit for selectively receiving counter values from said counting circuit, said coordinate value obtaining means having an input coupled to said first output of said detection presence/absence processing means for receiving said detection sensing signal from said detection presence/absence signal processing means, said coordinate value obtaining means including circuit means responsive to receipt of said detection sensing signal to couple the counter value to said coordinate value obtaining means and including means for processing said counter values received from said counting circuit to arrive at a coordinate value, said coordinate value obtaining means further including means for selectively providing at an output, upon the receipt of a coordinate value outputting control signal, a coordinate value; and
operation controlling means, having a first input coupled to the output of said scan termination judging means for receiving said scan termination signals from said scan termination judging means, said operation controlling means having a second input coupled to said second output of said detection presence/absence signal processing means for receiving said series sensing signal, said operation controlling means including control circuitry which, in response to receipt of said scan termination signal, determines the number of series sensing signals received and provides at a first output terminal a first operation controlling output signal when said operation controlling means judges that no series sensing signals have been received, and when said operation controlling means judges that one or more detection signal series sensing signals have been received, said operation controlling means provides at a second output terminal a second operation controlling output signal; means coupling said first output terminal of said operation controlling means to said reset terminal at said counting circuit and means coupling said second output terminal of said operation controlling means to a coordinate value outputting control signal terminal of said coordinate value obtaining means, whereby upon the output of said first operation controlling output signal said counting circuit is reset and upon output of said second operation controlling output signal the coordinate value corresponding to the input operation is provided at the coordinate value output of said coordinate value obtaining means.

8. A coordinate detecting device according to claim 7, wherein said operation controlling means includes:
counting means, which is reset and starts the counting, when said detection presence/absence signal processing means detects the first detection presence/absence signal of a series of one or more nondiscontinuous detection presence/absence signals.

9. A coordinate detecting device according to claim 7, wherein said coordinate detecting section includes light emitting elements and light sensitive elements, which are disposed opposite to each other and with a predetermined spacing.

10. A coordinate detecting device comprising:
a counting circuit for providing at an output a series of counter values, having reset signal input terminal, which, when when receiving a reset signal resets the counter to its beginning value and restarts said counting circuit;
a coordinate detecting section having a counter receiving input for receiving counter values from said counting circuit and for effecting scanning of a plurality of sensing elements driven one after another depending on the counter value outputted by said counting circuit, and detecting a coordinate input operation on the basis of said counter values received from said counting circuit, including a means for providing at an output a detection signal indicating the detection of a coordinate input operation;
means coupling the output of said counting circuit to said counter receiving input of said coordinate detecting section;
detection presence/absence judging means having an input for receiving detection signals from said coordinate detecting section and including means for detecting the receipt of a detection signal and providing at an output terminal a detection presence/absence signal which indicates that a coordinate input operation has been performed;
means coupling the output of said coordinate detecting section to said input of said detection presence/absence judging means;
scan termination judging means having an input coupled to the output of said counting circuit for receiving counter values from said counting circuit and including means for judging the termination of a scan on the basis of said counter values from said counting circuit, and means for providing at an output terminal a scan termination signal when a scan is judged to be terminated;
detection presence/absence signal processing means, having a first input terminal coupled to said output terminal of said detection presence/absence judging means for receiving detection presence/absence signals, said detection presence/absence signal processing means, including circuit means for providing at a first output terminal a detection sensing signal indicating receipt of at least one detection presence/absence signal, said detection presence/absence signal processing means further including circuit means for providing at a second output terminal a series sensing signal in response to receipt of a plurality of uninterrupted detection presence/absence signals from said detection presence/absence judging means, said detection presence/absence signal processing means having a second input coupled to said output of said scan termination judging means for receiving scan termination signals, said detection presence/absence processing means further including circuit means for resetting said detection presence/absence processing means at the end of said scan;
coordinate value obtaining means having an input coupled to the output of said counting circuit for selectively receiving counter values from said counting circuit, said coordinate value obtaining means having another input coupled to said first output of said detection presence/absence processing means for receiving said detection sensing signal, said coordinate value obtaining means including circuit means responsive to receipt of said detection sensing signal to couple the counter value to said coordinate value obtaining means and including means for processing said counter values received from said counting circuit to arrive at a coordinate value, said coordinate value obtaining means further including means for selectively providing at an output terminal, upon the receipt of a coordinate value outputting control signal at an outputting control signal terminal, a coordinate value;
coordinate memory means having an input terminal coupled to the output terminal of said coordinate value obtaining means for receiving coordinate values from said coordinate value obtaining means, and storing only the most recently received coordinate value, said coordinate memory means providing at an output terminal, the coordinate value stored in said coordinate memory means;
detection signal memory means for receiving and storing a detection status signal indicating that a coordinate input operation has occurred, said detection signal memory means having a detection status signal receiving input, and providing at an output terminal a detection signal status signal which indicates whether a coordinate input operation has occurred since the time a previous coordinate value was provided from said coordinate detecting device to a host computer;
operation controlling means, including status generating circuitry for generating a detection status signal in response to receipt of a series sensing signal, having an output terminal coupled to said counting circuit reset input terminal, an input terminal coupled to said scan termination judging means output terminal, having an input coupled to said second output terminal of said detection presence/absence signal processing means, an output terminal for providing said detection status signal, an input terminal coupled to said output terminal of said detection signal memory means, and an output terminal coupled to said coordinate value outputting control signal terminal, said operation controlling means further including control circuitry for providing control signals upon receipt of each said scan termination signal, said control circuitry providing a reset signal to said counting circuit if no series sensing signal was received and no coordinate input operation has occurred since the time a previous coordinate value was provided from said coordinate detecting device to said host computer, said circuitry further providing a reset signal to said counting circuit, providing a coordinate value outputting control signal, and providing a detection status signal if a series sensing signal was received, and said control circuitry providing a coordinate memory means output controlling signal if no series sensing signal was received and at least one coordinate input operation had occurred since the time a previous coordinate value was provided from said coordinate detecting device to said host computer; and outputting means, including a control terminal coupled to said operation controlling means, for selectively coupling said coordinate memory means output terminal to an output terminal of said outputting means to provide at said output terminal of said outputting means in response to receipt of a coordinate memory means output controlling signal the coordinate value stored in said coordinate memory means.

11. A coordinate detecting device according to claim 10, wherein said coordinate detecting section includes light emitting elements and light sensitive elements, which are disposed opposite to each other and with a predetermined spacing.

12. A coordinate detecting device responsive to coordinate input operations for providing to a host computer coordinate values comprising:

a counting circuit for providing at an output a series of counter values, having at least one reset signal input terminal, which, when when receiving a reset signal resets the counter to its beginning value and restarts said counting circuit;

a coordinate detecting section having a counter receiving input for receiving counter values from said counting circuit and for effecting scanning of a plurality of sensing elements driven one after another depending on the counter value outputted by said counting circuit, and detecting a coordinate input operation of the basis of said counter values received from said counting circuit, including a means for providing at an output a detection signal indicating the detection of a coordinate input operation;

means coupling the output of said counting circuit to said counter receiving input of said coordinate detecting section;

detection presence/absence judging means having an input for receiving detection signals from said coordinate detecting section and including means for detecting the receipt of a detection signal and providing at an output terminal a detection presence/absence signal which indicates that a coordinate input operation has been performed;

means coupling the output of said coordinate detecting section to said detection signal receiving input of said detection presence/absence judging means;

scan termination judging means having an input coupled to the output of said counting circuit for receiving counter values from said counting circuit and including means for judging the termination of a scan on the basis of said counter values from said counting circuit, and means for providing at an output terminal a scan termination signal when a scan is judged to be terminated;

detection presence/absence signal processing means, having a first input terminal coupled to said output terminal of said detection presence/absence judging means for receiving detection presence/absence signals, said detection presence/absence signal processing means, including circuit means for providing at a first output terminal a detection sensing signal indicating receipt of at least one detection presence/absence signal, said detection presence/absence signal processing means further including circuit means for providing at a second output terminal a series sensing signal in response to receipt of a plurality of uninterrupted detection presence/absence signals from said detection presence/absence judging means, said detection presence/absence signal processing means having a second input coupled to said output of said scan termination judging means for receiving scan termination signals, said detection presence/absence processing means further including circuit means for resetting said detection presence/absence processing means at the end of said scan;

coordinate value obtaining means having an input coupled to the output of said counting circuit for selectively receiving counter values from said counting circuit, said coordinate value obtaining means having an input coupled to said first output of said detection presence/absence processing means for receiving said detection sensing signal, said coordinate value obtaining means including circuit means responsive to receipt of said detection sensing signal to couple the counter value to said coordinate value obtaining means and including means for processing counter value received from said counting circuit to arrive at a signal representative of a coordinate value and generating signals representative of coordinate values, said coordinate value obtaining means further including means for selectively providing at an output terminal, upon the receipt of a coordinate value outputting control signal at an outputting control signal terminal, a signal representative of a coordinate value;

coordinate memory means having an input terminal coupled to the output terminal of said coordinate value obtaining means for receiving signals representative of coordinate values from said coordinate value obtaining means, and storing only the most recently received signal, said coordinate memory means providing at an output terminal, the signal representative of the coordinate value stored in said coordinate memory means;

detection signal memory means for receiving and storing a detection status signal indicating that a coordinate input operation has occurred, said detection signal memory means having a detection status signal receiving input terminal, and providing at an output terminal a detection signal status signal which indicates whether a coordinate input operation has occurred since the time a previous coordinate value was provided from said coordinate detecting device to said host computer;

comparing means including a preceding coordinate value memory means for storing a signal representative of the last coordinate value sent by said coordinate detecting device to said host computer, said comparing means having a first input terminal for receiving a signal representative of the last coordinate value sent by said coordinate detecting device to said host computer and having a second input terminal for receiving a signal representative of a coordinate value from said coordinate value obtaining means output terminal representing an indication that no detection signal has been received by said detection presence/absence judging means, said signal is provided to said preceding coordinate value memory means when a host computer reset signal is provided to said coordinate detecting device, said preceding coordinate value memory means further having a first preceding coordinate value means input terminal coupled to said coordinate value obtaining means output terminal, said preceding coordinate value memory means having a second preceding coordinate value means input terminal coupled to said coordinate detecting device output terminal which provides an output to said host computer, said comparing means having an output comparator which receives a signal representative of the signal stored in the preceding coordinate value memory means at a first input terminal, said comparing means output comparator having a second input terminal coupled to said coordinate memory means output terminal for receiving the signal representative of the coordinate value stored in said coordinate memory means, and said output comparator compares said signal representative of a coordinate value stored in said preceding coordinate value memory means with the signal representative of a coordinate value stored in said coordinate memory means and provides at an output terminal of said output comparator a signal for controlling the output of the last signal representative of a coordinate value last stored in said coordinate memory means to said host computer when said comparing means output comparator determines that said signal representative of a coordinate value stored in said coordinate memory means is different than said signal representative of a coordinate value stored in said preceding coordinate value memory means and when a comparing means controlling input signal is received at an input terminal of said output comparator causing said comparing means output comparator signal to be generated to permit said signal representative of a coordinate value stored in said coordinate memory means to be outputted to said host computer;

operation controlling means, including status generating circuitry for generating a detection status signal in response to receipt of a series sensing signal, said operation controlling means having an output terminal coupled to said counting circuit reset input terminal, an input terminal coupled to said scan termination judging means output terminal, having an input coupled to said detection signal series sensing signal output terminal, an output terminal for providing said detection status signal, an input terminal coupled to said output terminal of said detection signal memory means, an output terminal coupled to said coordinate value outputting control signal terminal, and an output terminal at which a coordinate memory means output controlling signal is provided, said operation controlling means further including control circuitry for providing control signals upon receipt of each said scan termination signal, said control circuitry providing a reset signal to said counting circuit if no series sensing signal was received and no coordinate input operation has occurred since the time a previous coordinate value was provided from said coordinate detecting device to said host computer, said circuitry further providing a reset signal to said counting circuit, providing a coordinate value outputting control signal, providing a detection status signal, and providing a comparing means controlling input signal, if a series sensing signal was received, and said control circuitry providing a coordinate memory means output controlling signal and providing an output signal to cause said coordinate value stored in said coordinate memory means to be outputted, if no series sensing signal was received and at least one coordinate input operation had occurred since the time a previous coordinate value was provided from said coordinate detecting device to said host computer; and outputting means, including at least one control terminal, for selectively coupling said coordinate memory means output terminal to said host computer, and providing an input signal to said host computer in response to receipt of said coordinate memory means output controlling output signal from said output controlling means, at said at least one control terminals, and further providing an input signal to said host computer in response to receipt of said comparing means output comparator signal from said comparing means output comparator at said at least one control terminal, said at least one control terminal being coupled to said said coordinate memory means output controlling output terminal of said operation controlling means and said output comparator signal terminal of said comparing means output comparator.

13. A coordinate detecting device according to claim 12, wherein said coordinate detecting section includes light emitting elements and light sensitive elements, which are disposed opposite to each other and with a predetermined spacing.

14. A coordinate detecting device comprising:

a counting circuit for providing at an output a series of counter values, said counting circuit including a reset signal input terminal and including circuit means to reset said counter upon receipt of a reset signal at reset terminals;

a coordinate detecting section having an input for receiving counter values from said counting circuit and for effecting scanning of a plurality of sensing elements driven one after another depending on the counter value outputted by said counting circuit, and detecting a coordinate input operation on the basis of said counter values received from said counting circuit, said coordinate detecting section including means for providing at an output a detection signal indicating the detection of a coordinate input operation;

means coupling the output of said counting circuit to the input of said coordinate detecting section;

scan termination judging means having an input for receiving counter values from said counting circuit and including means for judging the termination of a scan on the basis of said counter values received from said counting circuit, and means for providing at an output a scan termination signal at a time when a scan is judged to be terminated;

means coupling the output of said counting circuit to said counter receiving input of said scan termination judging means;

detection presence/absence judging means having an input for receiving detection signals from said coordinate detecting section and including means for detecting the receipt of a detection signal and providing at a first output a detection presence/absence signal which indicates that a coordinate input operation has been performed;

means coupling the output of said coordinate detecting section to the input of said detection presence/absence judging means;

detection presence/absence signal processing means, having an input coupled to said output of said detection presence/absence judging means for receiving detection presence/absence signals, said detection presence/absence signal processing means including circuit means for providing at a first output terminal a detection sensing signal indicating receipt of at least one detection presence/absence signal, said detection presence/absence signal processing means further including circuit means for providing, at a second output terminal, a series sensing signal in response to receipt of a plurality of uninterrupted detection presence/absence signals from said detection presence/absence judging means;

coordinate value obtaining means having an input coupled to the output of said counting circuit for selectively receiving counter values from said counting circuit, said coordinate value obtaining means having an input coupled to said first output of said detection presence/absence processing means for receiving said detection sensing signal from said detection presence/absence signal processing means, said coordinate value obtaining means including circuit means responsive to receipt of said detection sensing signal to couple the counter value to said coordinate value obtaining means and including means for processing said counter values received from said counting circuit to arrive at a coordinate value, said coordinate value obtaining means further including means for selectively providing at an output, upon the receipt of a coordinate value outputting control signal, a coordinate value;

coordinate memory means having an input terminal coupled to the output terminal of said coordinate value obtaining means receiving coordinate values from said coordinate value obtaining means and storing only the most recently received said coordinate memory means providing at an output terminal the coordinate value stored in said coordinate memory means;

detection area setting means for setting and storing a detection area corresponding to a plurality of chosen detection positions of said coordinate detecting section corresponding to a plurality of coordinate values derived from said coordinate value obtaining means through said coordinate memory means, said detection area setting means having an output terminal at which signals corresponding to said plurality of chosen detection signals are provided;

area code setting means for setting a chosen unique code corresponding for each of said plurality of chosen detection positions of said coordinate detecting section set and stored in said detection area setting means, said area code setting means having an output terminal at which codes corresponding to said plurality of chosen detection positions are provided;

position judging means having a first input coupled to the output of said coordinate memory means, having a second input coupled to the output of said detection area setting means, having a third input coupled to said output of said area code setting means, and having a control terminal for receiving input control signals, said position judging means including circuit means operative, upon the receipt of an input control signal at its control terminal, to compare the coordinate value received from said coordinate memory means with said signals corresponding to said plurality of chosen detection signals received from said detection area setting means, and when said position judging means judges that a coordinate value received from said coordinate detecting section corresponds to one of the plurality of chosen detection positions of said coordinate detecting section then said coordinate value received from said coordinate memory means is matched with a corresponding chosen area code received from said area code setting means corresponding to said detection area to which said coordinate value corresponds outputting said corresponding chosen area code to a host computer, and further when said position judging means judges that a coordinate value received from said coordinate detecting section does not correspond to one of the plurality of chosen detection positions of said coordinate detecting section then a reset signal is provided at an output terminal to said counting circuit causing counting to be reset and started again; and operation controlling means, having a first input coupled to the output of said scan termination judging means for receiving said scan termination signals from said scan termination judging means, said operation controlling means having a second input coupled to said second output of said detection presence/absence signal processing means for receiving said detection signal series sensing signal, said operation controlling means including control circuitry which, in response to receipt of said scan termination signal, determines the number of detection signal series sensing signals received and when said operation controlling means judges that no detection signal series sensing signals have been received it provides at a first output terminal a first operation controlling output signal, and when said operation controlling means judges that one or more detection signal series sensing signals have been received, said operation controlling means provides at a second output terminal a second operation controlling output signal;

means coupling said first output terminal of said operation controlling means to said reset terminal of said counting circuit and means coupling said second output terminal of said operation controlling means to said coordinate value outputting control signal terminal of said coordinate value obtaining means, and means coupling said second output terminal of said operation controlling means to said input controlling terminal of said position judging means; and whereby upon the output of said first operation controlling output signal said counting circuit is reset and upon output of said second operation controlling output signal the coordinate value corresponding to the input operation is provided at the coordinate value output of said coordinate value obtaining means and through said coordinate memory means to said first input of said position judging means and also upon the output of the second operation controlling output signal said position judging means evaluates the detection signal received and resets the counting circuit or provide an output signal to said host computer according to said evaluation.

15. A coordinate detecting device according to claim 14, wherein said coordinate detecting section includes light emitting elements and light sensitive elements, which are disposed opposite to each other and with a predetermined spacing.

* * * * *